United States Patent
Shen

(10) Patent No.: US 9,557,452 B2
(45) Date of Patent: Jan. 31, 2017

(54) ROOF MIRROR AND METHODS FOR FABRICATING ROOF MIRROR

(71) Applicant: Dar-Tson Shen, West Vancouver (CA)

(72) Inventor: Dar-Tson Shen, West Vancouver (CA)

(73) Assignee: Dar-Tson Shen, West Vancouver, BC (CA)

( * ) Notice: Subject to any disclaimer, the term of this patent is extended or adjusted under 35 U.S.C. 154(b) by 73 days.

(21) Appl. No.: 14/591,412

(22) Filed: Jan. 7, 2015

(65) Prior Publication Data

US 2015/0192708 A1    Jul. 9, 2015

Related U.S. Application Data

(60) Provisional application No. 61/924,652, filed on Jan. 7, 2014.

(51) Int. Cl.
| | |
|---|---|
| *G02B 5/04* | (2006.01) |
| *G02B 17/02* | (2006.01) |
| *G02B 17/04* | (2006.01) |
| *G02B 5/08* | (2006.01) |

(52) U.S. Cl.
CPC . *G02B 5/04* (2013.01); *G02B 5/08* (2013.01); *G02B 17/026* (2013.01); *G02B 17/045* (2013.01); *Y10T 29/49826* (2015.01)

(58) Field of Classification Search
CPC ........... G02B 5/04; G02B 5/08; G02B 5/0816; G02B 7/18; G02B 7/1805; G02B 17/026; G02B 17/045; G02B 5/132; Y01T 29/49826

USPC ......................... 359/836, 529, 530
See application file for complete search history.

(56) References Cited

U.S. PATENT DOCUMENTS

| | | | |
|---|---|---|---|
| 3,663,084 A | 5/1972 | Lipkins | |
| 4,065,204 A | 12/1977 | Lipkins | |
| 5,024,514 A | 6/1991 | Bleier et al. | |
| 5,130,840 A | 7/1992 | Iima et al. | |
| 5,335,111 A | 8/1994 | Bleier | |
| 6,729,735 B2 | 5/2004 | Bleier | |
| 6,945,661 B2 | 9/2005 | Bleier | |
| 2002/0131727 A1 | 9/2002 | Reedy et al. | |
| 2003/0230114 A1 | 12/2003 | Minamikawa | |
| 2005/0190810 A1 | 9/2005 | Butterworth et al. | |
| 2007/0035836 A1* | 2/2007 | Lyons, III | G02B 5/132 359/529 |

* cited by examiner

*Primary Examiner* — Euncha Cherry
(74) *Attorney, Agent, or Firm* — Todd A. Rattray; Oyen Wiggs Green & Mutala LLP

(57) ABSTRACT

An apparatus for providing a frameless hollow roof mirror comprises: a first element having a first mirrored surface and a first abutment surface; a second element having a second mirrored surface and a second abutment surface, the first and second elements arranged in a roof mirror configuration wherein the second abutment surface abuts against the first abutment surface and the first and second mirrored surfaces meet at a generally linear junction and are oriented relative to one another at a desired roof mirror angle; and a plurality of fasteners extending through the first and second abutment surfaces. The plurality of fasteners exerts a force to cause the first and second abutment surfaces to bear against each other.

38 Claims, 15 Drawing Sheets

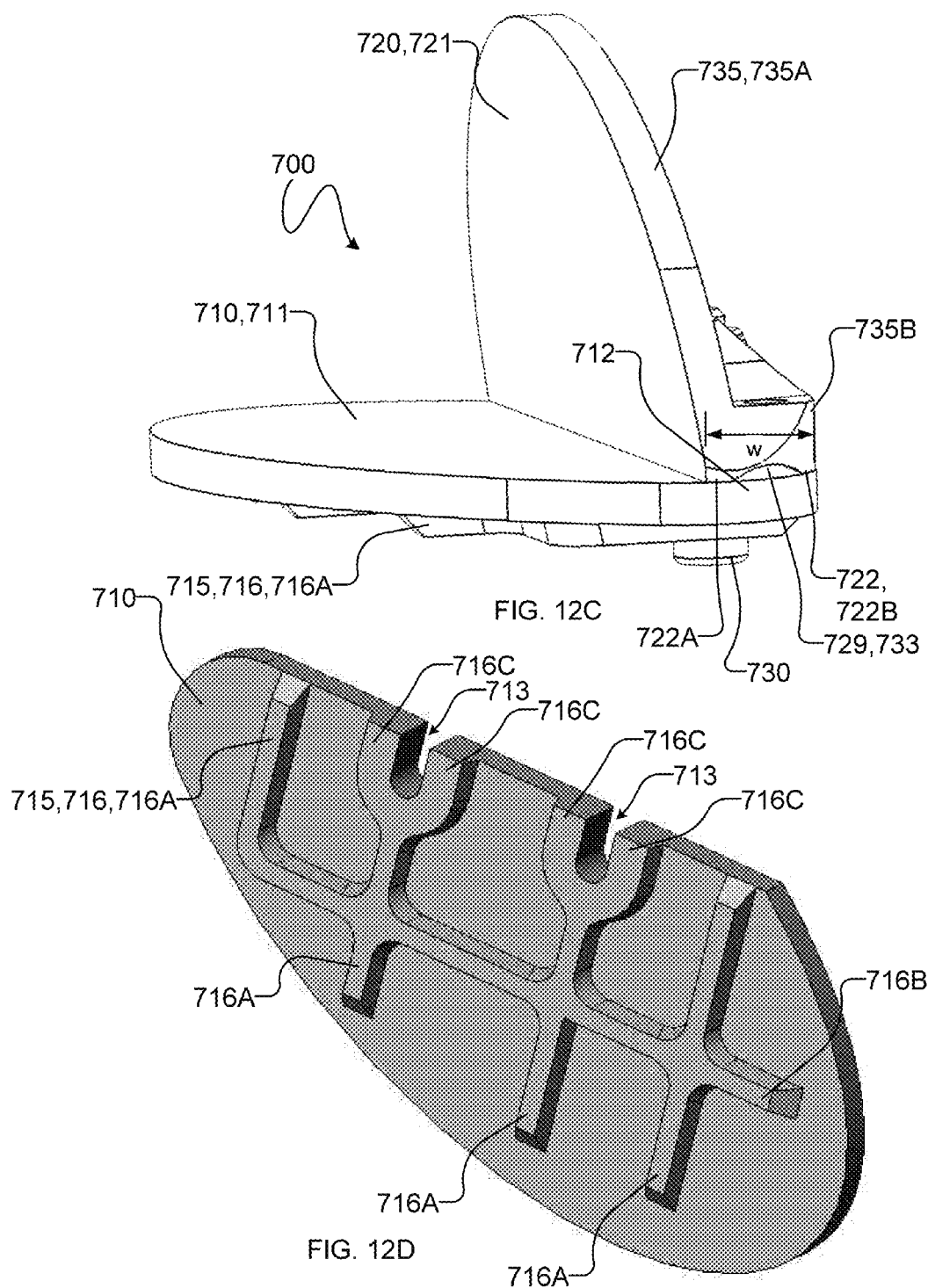

ROOF MIRROR AND METHODS FOR FABRICATING ROOF MIRROR

RELATED APPLICATIONS

This application claims the benefit of the priority of U.S. application No. 61/924,652, the entirety of which is hereby incorporated by reference herein.

TECHNICAL FIELD

The present invention relates to optical instruments. Particular embodiments provide optical components for reversing and inverting images. Particular embodiments provide frameless hollow roof mirrors and methods for fabricating same.

BACKGROUND

Sometimes optical systems, for example those associated with telescopes, microscopes and/or binoculars, are desirably configured to reverse and/or invert an image of an object.

As is well-known and illustrated in FIG. 1, a plane mirror 10 is a simple component for inverting an image I of an object O.

As is also well-known and illustrated in FIG. 2, two plane mirrors 20, 30 having respective mirrored surfaces 21, 31 are disposed at a right angle form a so-called roof mirror 40, which is a component capable of both inverting and reversing an image I of an object O.

It has proven challenging to build hollow roof mirrors accurately and robustly at reasonable cost and weight. Arranging and securing two delicate plane mirrors 20, 30 into a roof configuration can demand exacting tolerances during manufacture and assembly. Tiny gaps or misalignments tend to deform or destroy the optical path, as can any excess adhesive commonly used to retain plane mirrors 20, 30 in a roof configuration.

Plane mirrors 20, 30 may be attached to one another by an optical contact bond involving intermolecular forces. An optical contact bond may be formed by grinding and polishing abutment surfaces 22, 32 until they are highly conformal to each other, and then pressing abutment surfaces 22, 32 together. The polishing process may change the relative angles of abutment surfaces 22, 32 (e.g. relative to one another and/or relative to mirrored surfaces 21, 31), and this may affect the angle between mirrored portions 21, 31. This may make it difficult to form a desired angle between mirrored surfaces 21, 31 with the desirable degree of precision.

The problem of misaligned elements is also a concern in terms of durability. Over time, or through extended or extreme use, poorly designed elements that were originally aligned might slip out of alignment.

These manufacturing, assembly, and durability issues are important in many precision applications, such as for example, in optical components (e.g. telescopes, microscopes and/or binoculars) associated with sensitive measurement instruments. The challenges have been particularly present in manufacturing telescopes, binoculars and telescope and binocular accessories because there is a desire that telescopes and binoculars be sufficiently robust to survive use in the field. For example, there is a desire that telescopes and binoculars be able to survive vibrations during transportation to the field, survive temperature changes (and the associated thermal expansion/contraction, between storage, transportation and field environments), survive bad weather in the field, resist impact damage from hard use and the like.

One approach for attempting to satisfy these challenges has been to substitute two solid roof prisms for a hollow roof mirror. FIG. 3 shows an example of such an approach, where two solid roof prisms 50, 60 are configured into a so-called double Porro prism 70. When so configured, solid roof prisms 50, 60 take advantage of the phenomenon of total internal reflection to function as reflectors, not refractors. Light entering the solid roof prism 50 through a transmission facet 51 exits though the same transmission facet 51, after being twice internally reflected by reflection facets 52, 53. Similarly, light entering the solid roof prism 60 through a transmission facet 61 exits though the same transmission facet 61, after being twice internally reflected by reflection facets 62, 63.

Solid roof prisms and double Porro prisms have the advantage of being generally more robust than hollow roof mirrors. The reflection surfaces of the reflection facets being within the prism, the prism material is in essence being used as both reflector and frame. However, solid roof prisms also have significant disadvantages. One such disadvantage is the relative expense of manufacturing solid roof prisms, particularly in larger sizes. High-quality glass (which is itself expensive) must be carefully pressure-shaped under extreme heat and then slowly cooled. Even when great care is taken, this heating/cooling process still has a tendency to cause defects within the prism that can deform or otherwise negatively impact the optical path into, out of or through the glass. Another disadvantage associated with solid roof prisms is the typically greater weight associated with the full prism as opposed to the plane mirrors of the hollow roof mirror.

FIG. 4 illustrates another approach to satisfying these challenges which involves abutting two prisms 80, 90 together to create a hollow roof prism 100. A reflective coating is applied to the exterior surface of one facet on each prism 80, 90 (the reflection facets 81, 91) and the two reflection facets 81, 91 are disposed to form a right angle between them. Such a hollow roof prism 100 has a number of advantages. It is relatively robust and the interiors of component prisms 80, 90 need not be free of optical defects, because the optical path remains outside of component prisms 80, 90. However, the FIG. 4 hollow roof prism 100 also has disadvantages. Component prisms 80, 90 may still be more expensive and challenging to manufacture than simple plane mirrors and if component prisms 80, 90 are misaligned during assembly or use, they may not form an optically accurate roof. Roof prism 100 is also relatively heavy because of the extra material associated with component prisms 80, 90 (as compared to plane mirrors).

FIG. 5 illustrates still another approach to satisfying these challenges which involves constructing a framed hollow roof mirror 110, by disposing two plane mirrors 120, 130 at a right angle to form a roof and supporting plane mirrors 120, 130 with various frame components 140. In the case of the illustrated example, frame components 140 include: a base 141, opposing lateral supports 142 and 143, a plurality of shock-damping connectors 144, and opposing end-braces 145 (note that one of end-brace 145 has been removed from the FIG. 5 illustration so as not to obscure the other components of framed hollow roof mirror 110). While a framed hollow roof mirror benefits from the advantages that plane mirrors provide over prisms, it also suffers from the disadvantages inherent in a framing mechanism. By way of example, such disadvantages include additional weight and manufacturing and maintenance complications. Further-more, it is generally difficult to form a fine junction between the two plane mirrors at the apex of the roof and to maintain that junction during use.

The foregoing examples of the related art and limitations related thereto are intended to be illustrative and not exclusive. Other limitations of the related art will become apparent to those of skill in the art upon a reading of the specification and a study of the drawings.

There remains a general need for effective apparatus and methods for roof mirrors.

SUMMARY

The following embodiments and aspects thereof are described and illustrated in conjunction with apparatus and methods which are meant to be exemplary and illustrative, not limiting in scope. In various embodiments, one or more of the above-described problems have been reduced or eliminated, while other embodiments are directed to other improvements.

The invention has a number of aspects. One aspect of the invention provides an apparatus for providing a frameless hollow roof mirror comprises: a first element having a first mirrored surface and a first abutment surface; a second element having a second mirrored surface and a second abutment surface, the first and second elements arranged in a roof mirror configuration wherein the second abutment surface abuts against the first abutment surface and the first and second mirrored surfaces meet at a generally linear junction and are oriented relative to one another at a desired roof mirror angle; and a plurality of fasteners extending through the first and second abutment surfaces. The plurality of fasteners exert a force to cause the first and second abutment surfaces to bear against each other.

Another aspect of the invention provides a method for assembling a frameless hollow roof mirror, the method comprising: providing a first element having a first mirrored surface and a first abutment surface; providing a second element having a second mirrored surface and a second abutment surface; arranging the first and second elements in a roof mirror configuration wherein the second abutment surface abuts against the first abutment surface and the first and second mirrored surfaces meet at a generally linear junction and are oriented relative to one another at a desired roof mirror angle; and extending a plurality of fasteners through the first and second abutment surfaces to thereby exert a force to cause the first and second abutment surfaces to bear against each other.

Further aspects of the invention and non-limiting example embodiments of the invention are illustrated in the accompanying drawings and/or described in the following description.

BRIEF DESCRIPTION OF THE DRAWINGS

The accompanying drawings illustrate non-limiting example embodiments of the invention.

FIGS. 12A-12C are various isometric views of a roof mirror according to an example embodiment. FIGS. 12D and 12E are isometric views of the first mirror element and the second mirror element of the roof mirror of FIGS. 12A-12C.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 7A:
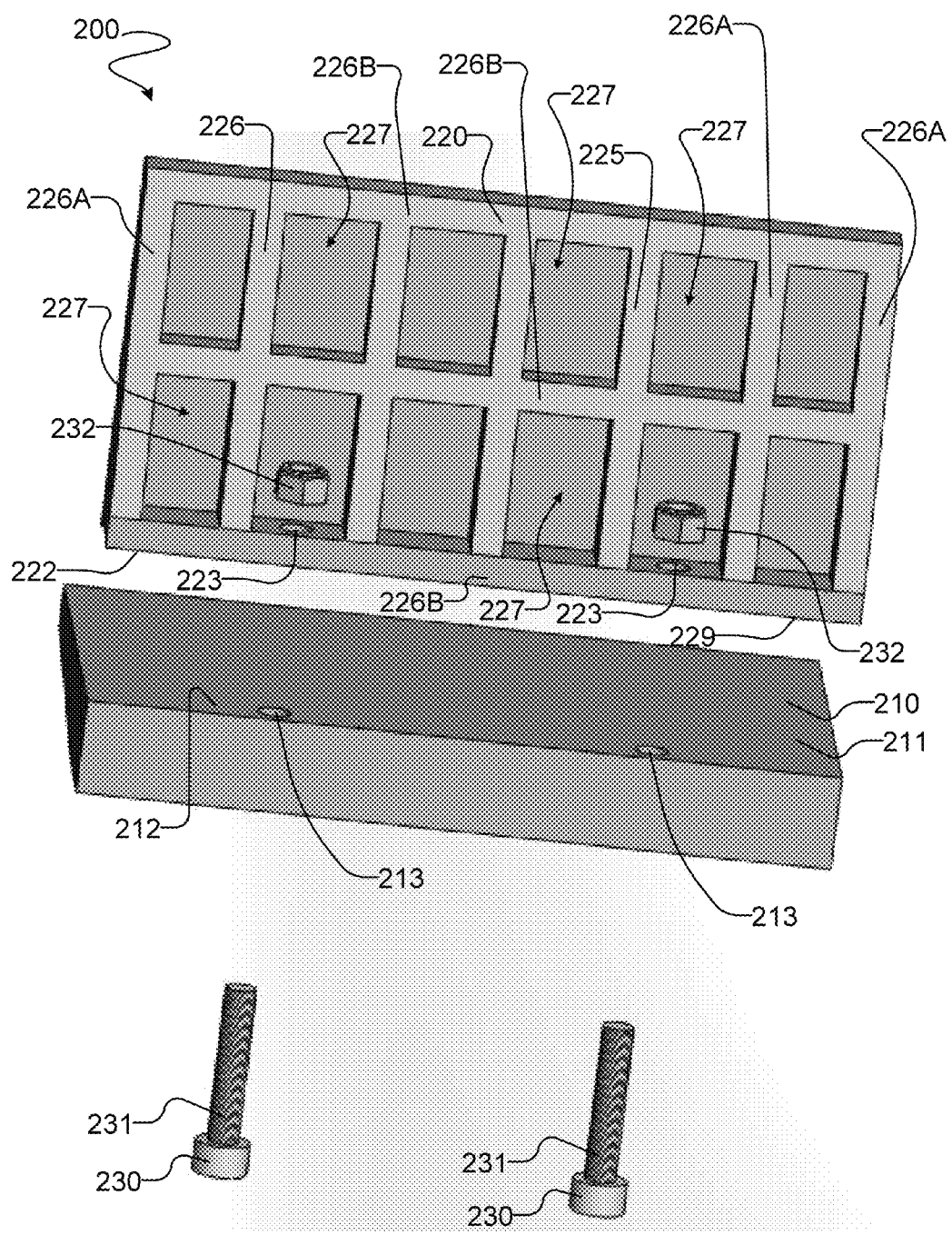
FIGS. 7A-7C (together, FIG. 7) are top-back isometric, bottom-back isometric, and side isometric views, respectively, of the FIG. 6 roof mirror in an unassembled state.
Figure 7B:
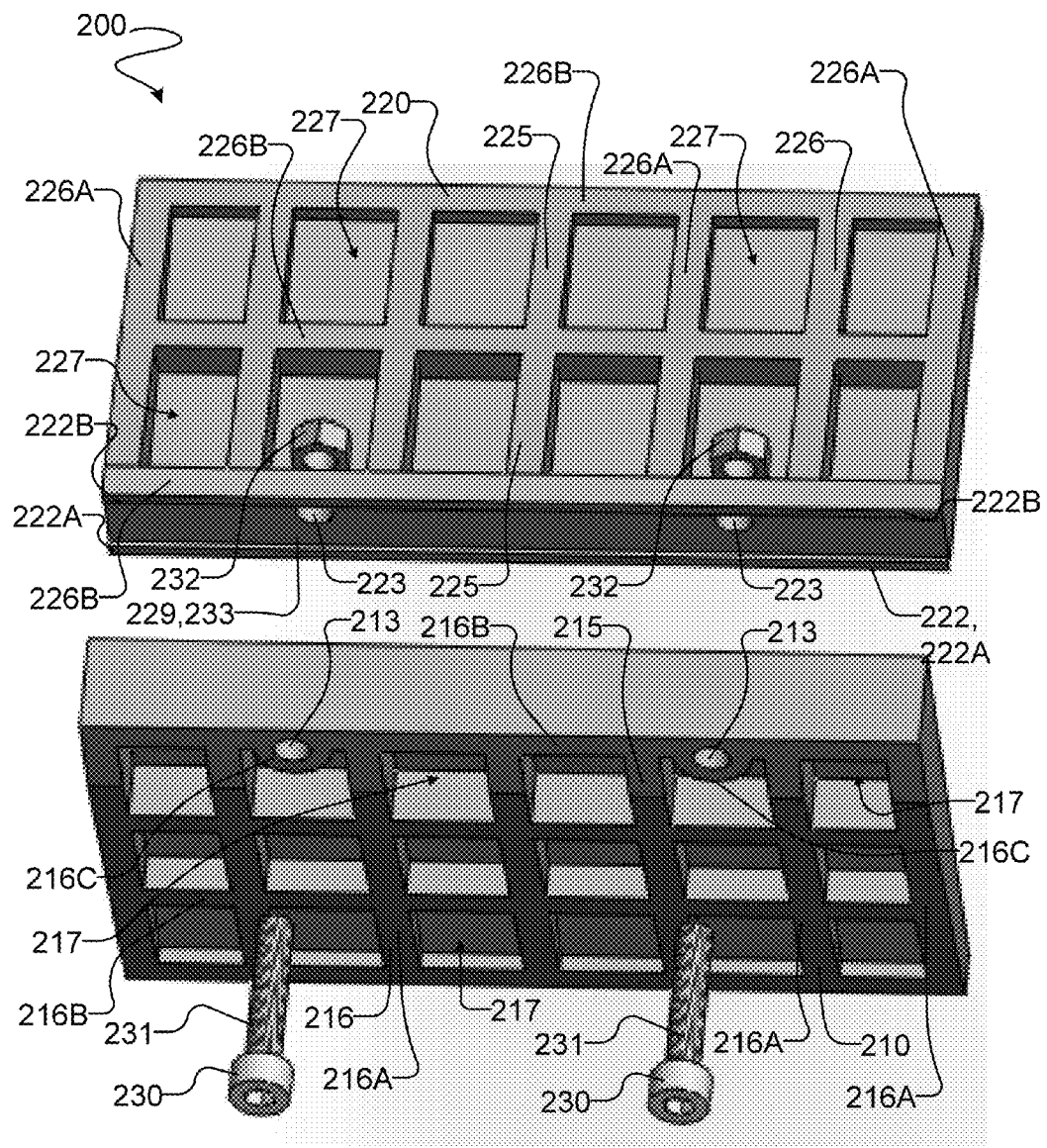
Figure 7C:
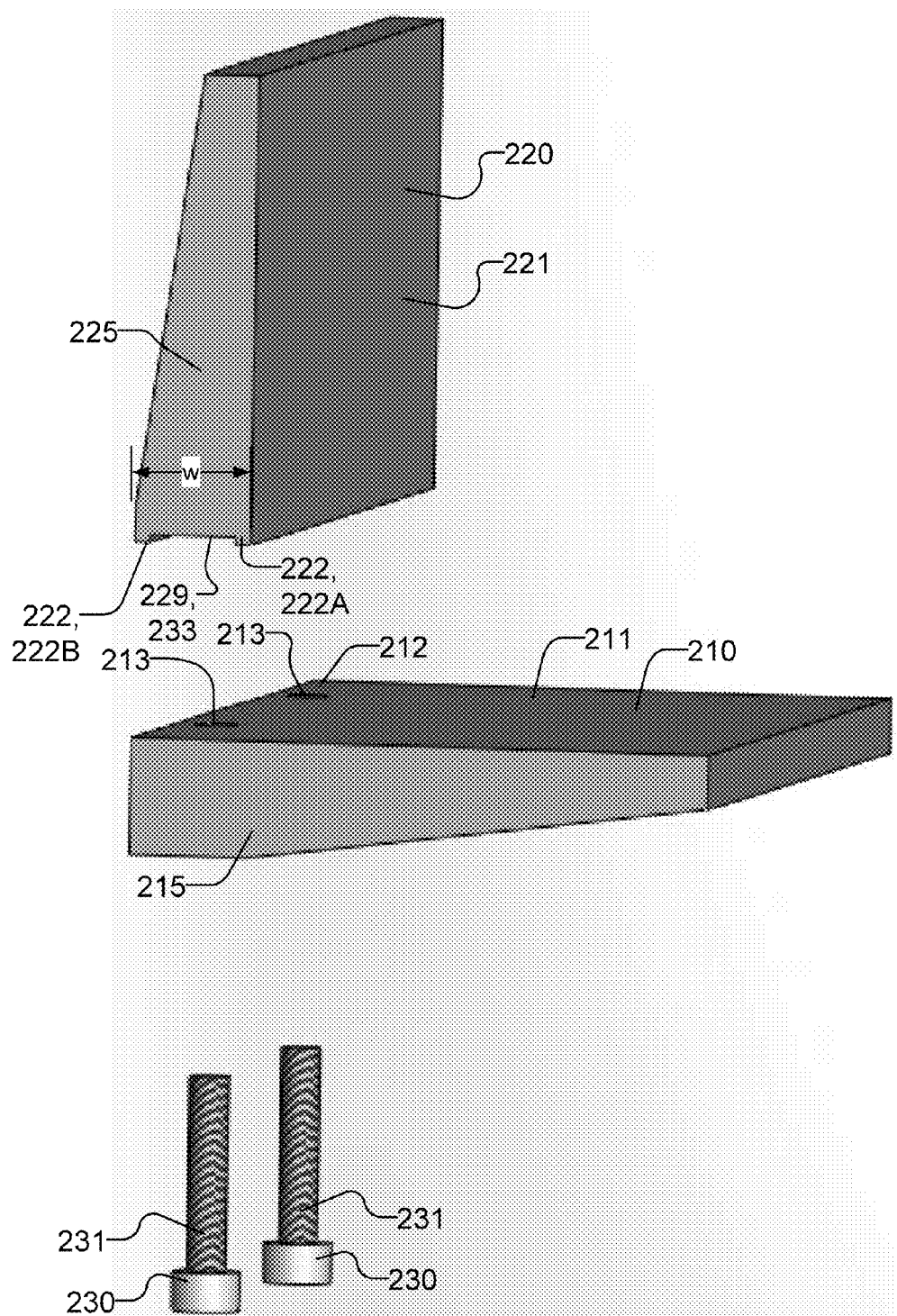

FIGS. 6A-6G are side elevation, front elevation, back elevation, front-isometric, back-isometric, top, and bottom views, respectively, of a roof mirror 200 according to an example embodiment. FIGS. 7A-7C are bottom-back isometric, top-back isometric, and side isometric views, respectively, of roof mirror 200 in an unassembled state.

Roof mirror 200 comprises first and second mirror elements 210, 220. First mirror element 210 comprises a first planar mirrored surface 211 and a first abutment surface 212. First mirror element 210 may generally be fabricated from glass as is known in the art. First mirrored surface 211 may be fabricated on a planar (e.g. ground and/or polished) surface of first mirror element 210 using any suitable technique—e.g. using any of a variety of suitable coating materials and coating processes known in the art. In the illustrated embodiment, first abutment surface 212 is coplanar with first mirrored surface 211, although this is not necessary. First abutment surface 212 may comprise a portion of first mirrored surface 211, although it is not necessary that first abutment surface be mirrored. In some embodiments, first abutment surface 212 is not mirrored and is in a plane generally parallel with first mirrored surface 211 but offset from first mirrored surface 211 by the depth of the mirror coating applied to first mirrored surface 211.

Second mirror element 220 comprises a second mirrored surface 221 and a second abutment surface 222. Second mirror element 220 may generally be fabricated from glass as is known in the art. Second mirrored surface 221 may be fabricated on a planar (e.g. ground) surface of second mirror element 220 using any suitable technique—e.g. using any of a variety of suitable coating materials and coating processes known in the art. In the illustrated embodiment, second abutment surface 222 and second mirrored surface 221 comprise generally planar surfaces, wherein these planar surfaces are oriented orthogonally to one another. In other embodiments, second abutment surface 222 and second mirrored surface 221 comprises generally planar surfaces having other angular orientations relative to one another.

In the illustrated embodiment, as seen best in FIG. 7C, second abutment surface 222 is provided by a pair of abutment sub-surfaces 222A, 222B, each of which as a cross-sectional width that is less than the width (w) of second mirror element 220 at the base 229 of second mirror element 220. This pair of abutment sub-surfaces 222A, 222B provides the base 229 of second mirror element 220 with an inverted-U-shaped profile comprising: abutment sub-surfaces 222A, 222B which extend along corresponding longitudinal edges of base 229 (e.g. along edges that extend into the page of FIG. 6A and orthogonal to the width w shown in FIG. 7C and which are generally parallel to the linear junction X); and a concavity 233 located between abutment sub-surfaces 222A, 222B, wherein concavity 233 opens toward first abutment surface 212 of first mirror element 210. Providing a pair of abutment sub-surfaces 222A, 222B each of which having a cross-sectional width less than the cross-sectional width (w) of base 229 and concavity 233 therebetween may be advantageous in that this shape reduces the contact area between first and second abutment surfaces 212, 222, thereby: minimizing the chance of an impurity (e.g. dust) or a material defect impacting the angle between mirrored surfaces 211, 221; minimizing the likelihood of grinding/polishing errors on abutment surfaces 212, 222 impacting the angle between mirrored surfaces 211, 221; and permitting possible use of different surface levels for sub-surfaces 222A, 222B to provide angle compensation.

First and second mirror elements 210, 220 of roof mirror 200 are oriented relative to one another such that first and second abutment surfaces 212, 222 contact one another in an abutting relationship. When so oriented, first and second mirror elements 210, 220 are attached to each other by fasteners 230 which pass through first and second abutment surfaces 212, 222. In the illustrated embodiment, fasteners 230 extend through fastener-receiving holes 213, 223 defined in first and second mirror elements 210, 220 in the vicinities of first and second abutment surfaces 212, 222, respectively (best seen in FIGS. 7A and 7B). In some embodiments, holes 213 and/or holes 223 may be replaced by other types of openings or slots (e.g. slots having "U-shaped" cross-sections such that fasteners can move through the open side of the U-shaped cross-section; see FIGS. 12A-12E and the corresponding discussion below). First and second mirror elements 210, 220 may be formed (e.g. molded) with holes 213, 223, respectively. Alternatively holes 213, 223 may be cut or otherwise made in first and second mirror elements 210, 220, respectively, by any suitable process (e.g. drilling).

In the illustrated embodiment, roof mirror 200 comprises two fasteners 230. In other embodiments, mirror 200 may comprise any suitable number of fasteners 230 and the number of fasteners 230 may depend on the sizes of mirror elements 210, 220 and/or abutment surfaces 212, 222. In the illustrated embodiment, fasteners 230 comprise two-part fasteners with first fastener components (e.g. bolts and/or the like) 231 and second fastener components (e.g. nuts and/or the like) 232. In some embodiments, fasteners 230 may comprise other suitable type(s) of fasteners.

Fasteners 230 may be tightened to force first abutment surface 212 to bear against second abutment surface 222 in an abutting relationship. In the illustrated embodiment, first abutment surface 212 and first mirrored surface 211 are coplanar (or on parallel planes) and second abutment surface 222 and second mirrored surface 221 are oriented orthogonally to one another. This geometry causes the relative orientation of first mirrored surface 211 and second mirrored surface 221 to be orthogonal to one another when first abutment surface 212 abuts against second abutment surface 222 and mirror elements 210, 220 are attached to one another by fasteners 230. The orthogonal relationship between first and second mirrored surfaces 211, 221 provides roof mirror 200. Roof mirror 200 is frameless in the sense that it does not require any framing components (i.e. components other than mirror elements 210, 220 and fasteners 230) and is hollow in the sense that in use light (e.g. the light associated with reversing and inverting images of objects) is reflected from mirrored surfaces 211, 221 and does not penetrate mirror elements 210, 220.

In some embodiments it may be desirable for the angle between first mirrored surface 211 and second mirrored surface 221 to have a high degree of accuracy and to provide manufacturing methods able to achieve this accuracy with a high degree of precision. For example, in some embodiments, it may be desirable for the relative orientation of first and second mirrored surfaces 211, 221 to be within one, five, or ten arc seconds of some value (e.g. 90 degrees). In some embodiments, this requirement can be somewhat more relaxed and the desired relative orientation of mirrored surfaces 211, 221 may be within 8 arc minutes or 5 arc minutes of some value (e.g. 90 degrees). It has been found that roof mirror 200 of the illustrated embodiment and the methods of manufacturing roof mirror 200 are well suited to achieving such accuracy and precision.

In some embodiments, before first and second mirror elements 210, 220 are attached to one another, abutment surfaces 212, 222 are ground and polished to a flatness in a range of less than or equal to $0.5\lambda$, where $\lambda$ is the mean wavelength of the light anticipated for use in a particular application (e.g. $\lambda$ may be in a range of 500 nm-600 nm for most visible white light applications). In some embodiments, this flatness is less than or equal to $0.25\lambda$. In some embodiments, abutment surfaces 212, 222 are ground and polished to a level of flatness which corresponds to the angle between first and second mirrored surfaces 211, 221 being less than or equal to 30 arc seconds from a desired angle (e.g. within +/−30 arc seconds of orthogonal). In some embodiments, the grinding and polishing of abutment surfaces 212, 222 is such that the angle between first and second mirrored surfaces 211, 221 is less than or equal to 20 arc seconds from a desired angle (e.g. within +/−20 arc seconds of orthogonal).

First mirrored surface 211 and second mirrored surface 221 meet at a generally linear junction X. In some embodiments, it can be desirable for junction X to have minimum possible dimensions to avoid dead zones in resultant images.

In the illustrated embodiment, as best seen in FIGS. 7A and 7B, second mirror element 220 comprises a support structure 225 along a side of second mirror element 220 generally opposing second mirrored surface 221. In the illustrated embodiment, support structure 225 comprises a raised portion 226 which extends away from the plane of second mirrored surface 221 in a direction away from the operative side of second mirrored surface 221 (e.g. extends relatively far in this direction as compared to the other portions of second mirror element 210). In the illustrated embodiment, raised portion 226 is shaped to define a plurality of concavities 227 which open away from second mirrored surface 221 in the direction away from the operative side of second mirrored surface 221. In some embodiments, raised portion 226 is integrally formed with the remainder of second mirror element 220. In some embodiments, raised portion 226 is separately formed and then attached to the remainder of second mirror element 220—e.g. by heating raised portion 226 and the remainder of second mirror element 220 to form a bond therebetween.

In the illustrated embodiment, raised portion 226 comprises a grid of orthogonally oriented segments 226A, 226B which extend across second mirror element 220 to define concavities 227 having generally rectangular cross-sections bounded on four sides by raised portion 226. In some embodiments, raised portion 226 and concavities 227 defined thereby may have different shapes. In some embodiments, the cross-sections of concavities 227 are completely bounded by raised portion 226. This is not necessary. In some embodiments, the cross-sections of concavities 227 may be partially bounded by raised portion 226. The amount of extension of raised portion 226 away from the plane of second mirrored surface 221 in the direction away from the operative side of second mirrored surface 221 (and the corresponding depth of concavities 227) may be constant, or it may vary. In the illustrated embodiment, the extension of raised portion 226 away from the plane of second mirrored surface 221 in the direction away from the operative side of second mirrored surface 221 (and the corresponding depth of concavities 227) decreases at locations further away from second abutment surface 222.

Raised portion 226 of support structure 225 may provide structural rigidity to second mirror element 220 so that second mirrored surface 221 remains substantially flat even when roof mirror 200 is subjected to vibrations, shocks, thermal expansion, or other forces. A portion of raised portion 226 (e.g. one of segments 226B) may extend along a portion of second abutment surface 222. This portion of support structure 225 may act to help maintain the angle between second abutment surface 222 second mirrored surface 221 even when second mirror element 220 is subject to vibrations, shocks, thermal expansion, or other forces.

At the same time, support structure 225 can reduce the amount and corresponding cost of materials (and the corresponding weight of second mirror component 220) by providing a network of support (e.g. raised portion 226, including, for example, segments 226A, 226B) at spaced apart locations (e.g. at locations away from concavities 227) which provide sufficient rigidity to maintain the flatness of mirrored surface 221 and the relative angle between second abutment surface 222 and second mirrored surface 221, while minimizing (or at least reducing) the amount of material (and the corresponding weight of material) used to make second mirror element 220 (e.g. because of concavities 227). In some embodiments, the surface area of the openings of cavities 227 is significantly larger than the surface area of raised portion 226 (e.g. greater than 2.5 times larger, 5 times larger or 10 times larger in various embodiments) which achieves the aforementioned reduction on the amount, cost and weight of materials.

As shown best in FIGS. 7A and 7B, concavities 227 may also facilitate the attachment of second mirror element 220 to first mirror element by housing a portion of fasteners 230—i.e. a portion of each fastener 230 may be located in a corresponding concavity 227 adjacent to abutment surface 222. In some embodiments, concavities 227 may house one of first or second fastener components 231, 232. In the illustrated embodiment, second fastener components 232 (e.g. nuts and/or the like) are located in concavities 227. In some embodiments, portions of first fastener components 231 (e.g. the heads of bolts and/or the like) are located in concavities 227. To facilitate this location of fastener components 231, 232, fastener-receiving holes 223 may be defined to extend through raised portion 226. In the illustrated embodiment, fastener-receiving holes 223 are defined to extend through segment 226B of raised portion 226 that is most proximate to abutment surface 222.

Support structure 225 is not necessary. In some embodiments, second mirror component 220 does not include a support structure.

In the illustrated embodiment, as best seen in FIG. 7B, first mirror element 210 also comprises a support structure 215 along a side of first mirror element 210 generally opposing first mirrored surface 211. In the illustrated embodiment, support structure 215 comprises a raised portion 216 which extends away from the plane of first mirrored surface 211 in a direction away from the operative side of first mirrored surface 211 (e.g. extends relatively far in this direction as compared to the other portions of first mirror element 210). In the illustrated embodiment, raised portion 216 is shaped to define a plurality of concavities 217 which open away from first mirrored surface 211 in the direction away from the operative side of first mirrored surface 211. In some embodiments, raised portion 216 is integrally formed with the remainder of first mirror element 210. In some embodiments, raised portion 216 is separately formed and then attached to the remainder of first mirror element 210—e.g. by heating raised portion 216 and the remainder of first mirror element 210 to form a bond therebetween.

In the illustrated embodiment, raised portion 216 comprises a grid of orthogonally oriented segments 216A, 216B which extend across first mirror element 210 to define rectangular concavities 217 having generally rectangular cross-sections bounded on four sides by raised portion 216. In the illustrated embodiment, raised portion 216 also comprises segments 216C which surround apertures 213 to provide surfaces for fasteners 230 to bear against. In some embodiments, raised portion 216 and concavities 217 defined thereby may have different shapes. In some embodiments, the cross-sections of concavities 217 are completely bounded by raised portion 216. This is not necessary. In some embodiments, the cross-sections of concavities 227 may be partially bounded by raised portion 226. The amount of extension of raised portion 216 away from the plane of first mirrored surface 211 in the direction away from the operative side of first mirrored surface 211 (and the corresponding depth of concavities 217) may be constant, or it may vary. In the illustrated embodiment, the extension of raised portion 216 away from the plane of first mirrored surface 211 in the direction away from the operative side of first mirrored surface 211 (and the corresponding depth of concavities 217) decreases at locations further away from first abutment surface 212.

Like raised portion 226 described above, raised portion 216 of support structure 215 may provide structural rigidity to first mirror element 210 so that first mirrored surface 211 remains substantially flat and the orientation between first abutment surface 212 and first mirrored surface 211 is maintained, even when roof mirror 200 is subjected to vibrations, shocks, thermal expansion, or other forces. Also, like support structure 225, support structure 215 can reduce the amount and corresponding cost and weight of materials associated with manufacturing first mirror element 210 and the corresponding weight of first mirror element 210. In these respects, support structure 215 may have characteristics similar to those of support structure 225 described above. Like support structure 225, support structure 215 is not necessary. In some embodiments, first mirror component 210 does not include a support structure.

Figure 8:
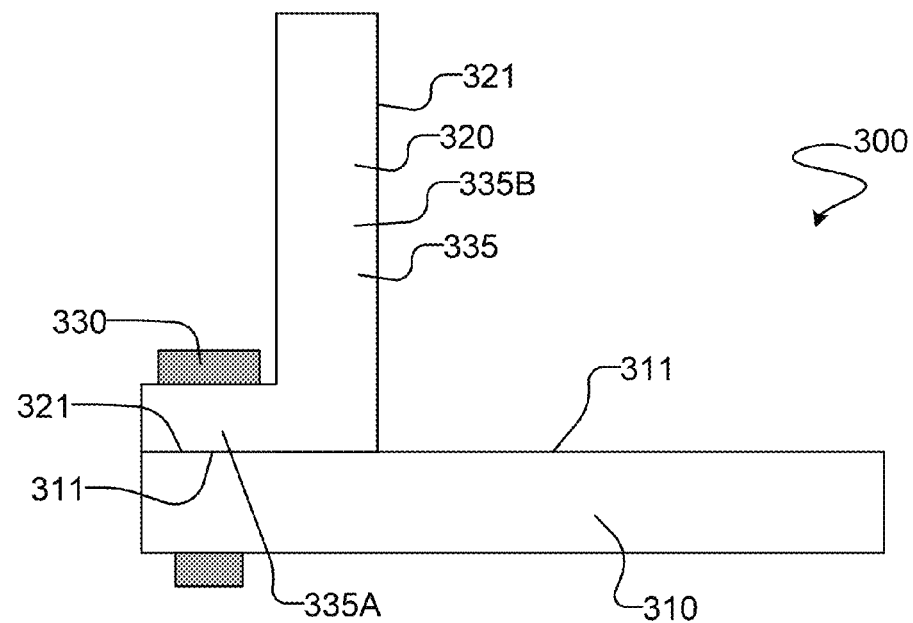
FIG. 8 is a side elevation view of a roof mirror according to an example embodiment.

FIG. 8 is a side-elevation view of a roof mirror 300 according to an example embodiment. Roof mirror 300 comprises first and second mirror elements 310, 320 comprising mirrored surfaces 311, 321 and abutment surfaces 312, 322, respectively. First and second mirror elements 310, 320 may optionally comprise support structures similar to support structures 215, 225 of roof mirror 200, although such support structures are not visible in the illustrated view of FIG. 8. First and second mirror elements 310, 320 are attached by fasteners 330 (which may be substantially similar to fasteners 230) passing through abutment surfaces 312, 322.

Roof mirror 300 differs primarily from roof mirror 200 in that second mirror element 320 of roof mirror 300 comprises a body 335 with a "L-shaped" cross-section comprising a tail section 335A which comprises second abutment surface 322 and a leg section 335B which comprises second mirrored surface 321. In the illustrated embodiment, second abutment surface 322 of tail section 335A is oriented orthogonally to second mirrored surface 321 of leg section 335B. Tail section 335A extends away from mirrored surface 321 (in a direction away from the operative side of mirrored surface 321) by an amount which is greater than the extension of leg section 335B in the same direction. This extension of tail section 335A away from mirrored surface 321 provides a convenient location for projecting fasteners 330 through tail section 335A (e.g. through suitable apertures or suitable U-shaped openings (not visible in the FIG. 8 view) to attach first mirror element 310 to second mirror element 320. This is shown in FIG. 8, where fasteners 330 project through tail section 335A of L-shaped body 335 to attach first and second mirror elements 310, 320. In other respects, features of roof mirror 300 (and its various components) may be the same as or similar to those of roof mirror 200 (and its various components) described herein.

Figure 9:
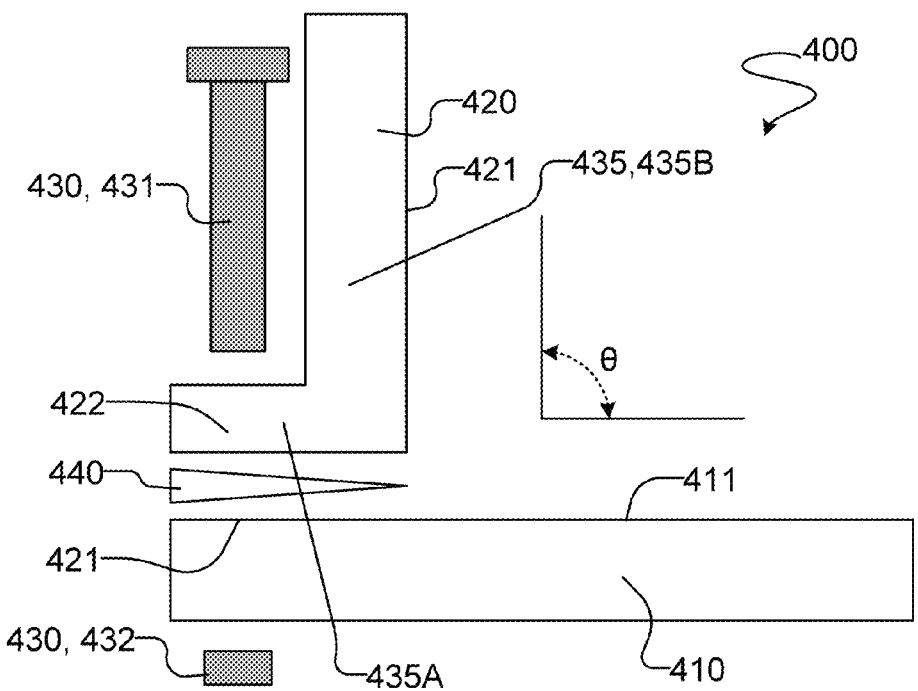
FIG. 9 is a side elevation view of an unassembled roof mirror according to an example embodiment.

FIG. 9 is a side-elevation view of an unassembled roof mirror 400 according to another example embodiment. Roof mirror 400 comprises first and second mirror elements 410, 420 comprising first and second mirrored surfaces 411, 421 and first and second abutment surfaces 421, 422, respectively. First and second mirror elements 410, 420 may optionally comprise support structures similar to support structures 215, 225 of roof mirror 200, although such support structures are not visible in the illustrated view of FIG. 9. Like roof mirror 300 of FIG. 8, second mirror element 430 of roof mirror 400 comprises a body 435 with an L-shaped cross-section having a tail section 435A and a leg section 435B similar to tail section 335A and leg section 335B described above. A shim 440 is located between abutment surfaces 421, 422. Shim 440 may have a tapered profile. Shim 440 may be made of a compressible material.

Roof mirror 400 may be assembled by attaching first and second mirror elements 410, 420 via fasteners 430 (e.g. two-part fasteners comprising bolts 431 and nuts 432 and/or the like) passing through first and second abutment surfaces 421, 422. The presence of shim 440 may impact the angle θ between first and second mirrored surfaces 411, 421. For example, the presence of shim 440 may cause angle θ to be less than 90 degrees. By tightening fasteners 430, shim 440 may be compressed, thereby changing angle θ. Fasteners 430 may be tightened (or loosened) until angle θ reaches a desired value (e.g. 90 degrees). Additionally or alternatively, the amount of shim 440 (and corresponding thickness of shim 440) disposed between first and second abutment surfaces 411, 421 may be adjusted to adjust the angle θ between first and second mirrored surfaces 411, 421. In other respects, features of roof mirror 400 (and its various components) may be the same as or similar to those of roof mirror 200 (and its various components) described herein.

Figure 10:
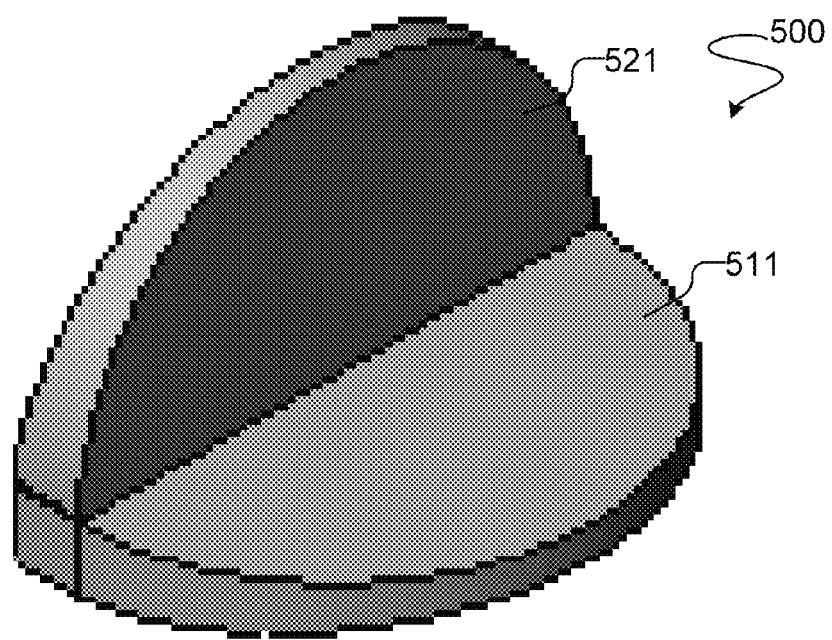
FIG. 10 is a front isometric view of roof mirror with semi-circular elements according to an example embodiment.
Figure 11:
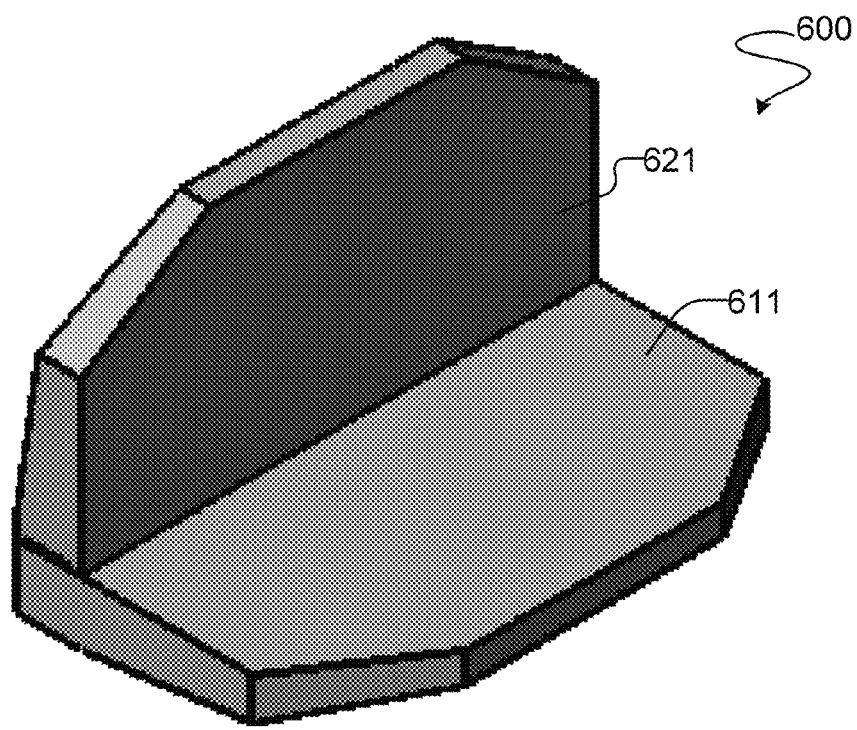
FIG. 11 is a front isometric view of roof mirror with polygonal elements according to an example embodiment.

In some embodiments of the invention, the first and second mirrored surfaces of the first and second mirror elements of a roof mirror may be non-rectangular. The first and second mirrored surfaces (and the corresponding first and second mirror elements) may have any suitable shape. FIG. 10 is an isometric view of a roof mirror 500 with semi-circular first and second mirrored surfaces 511, 521. FIG. 11 is an isometric view of a roof mirror 600 with polygonal first and second mirrored surfaces 611, 621. In other respects, features of roof mirrors 500, 600 (and its various components) may be the same as or similar to those of roof mirror 200 (and its various components) described herein.

Figure 12A:
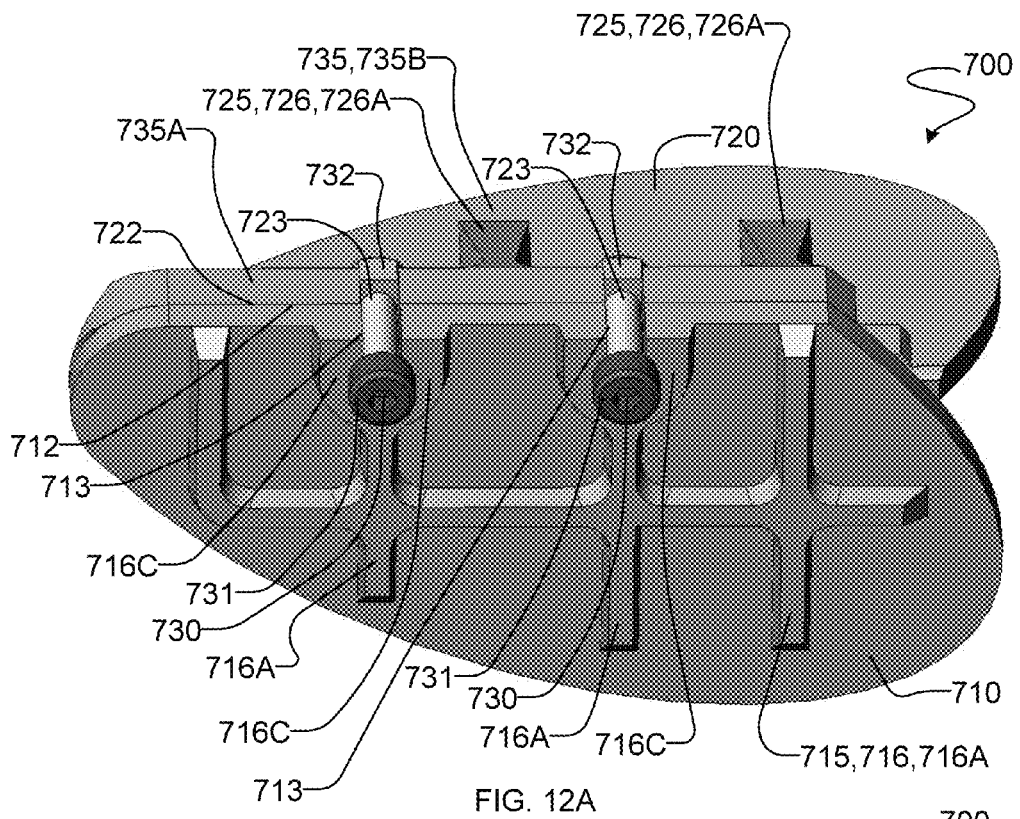
Figure 12B:
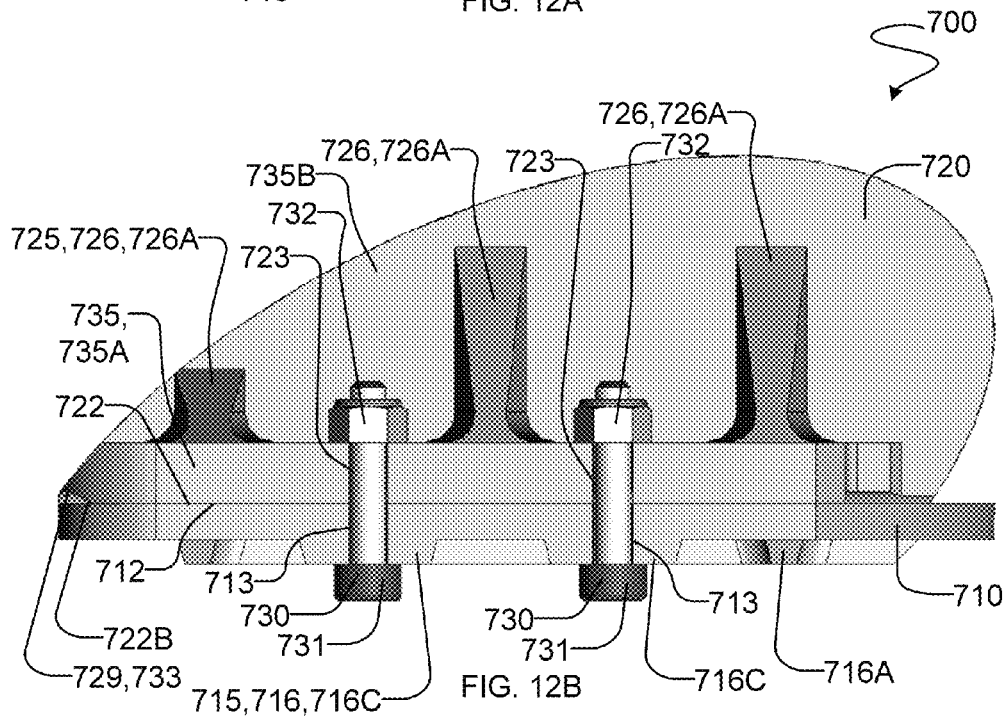
Figure 12E:
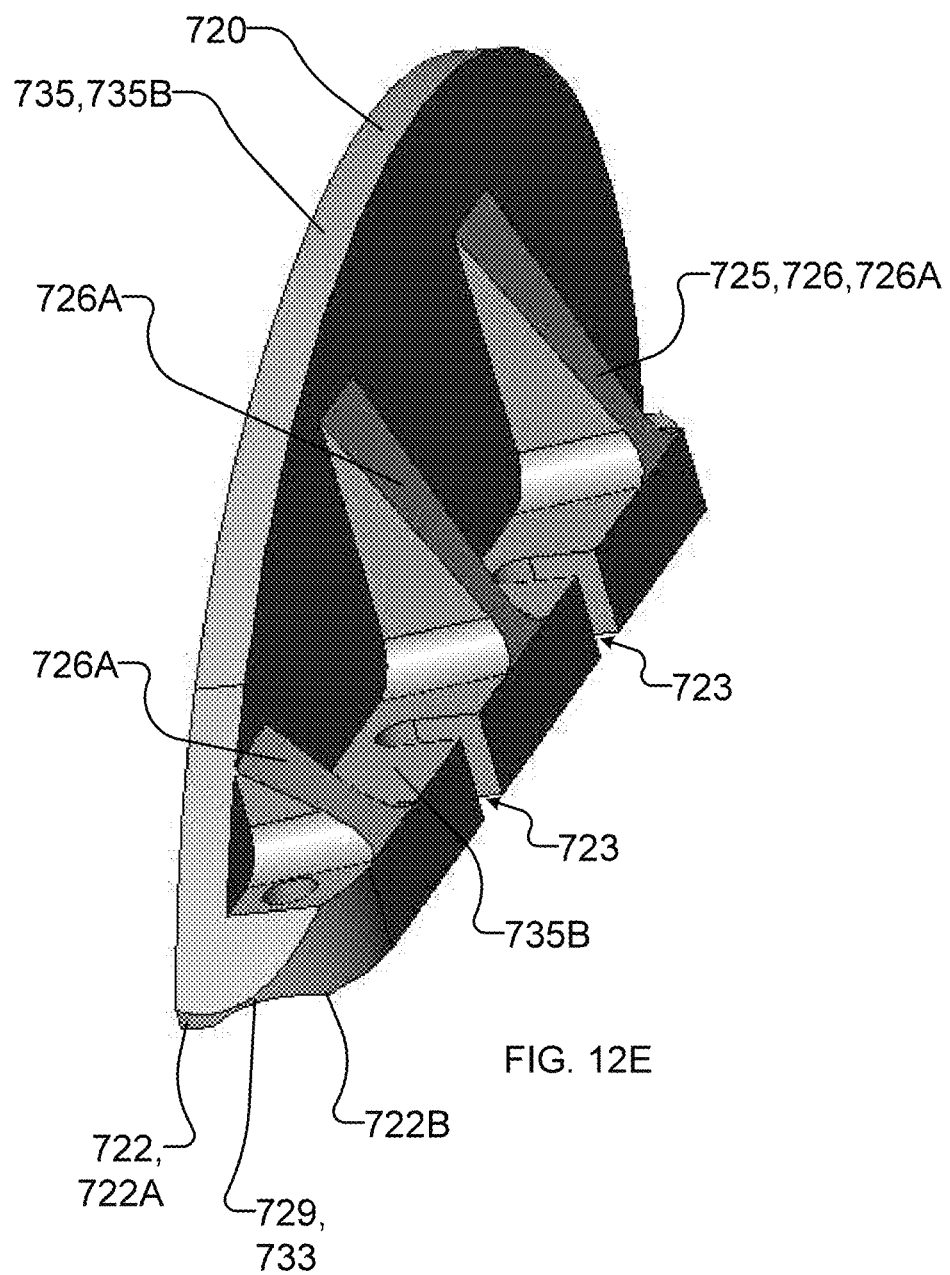

FIGS. 12A-12C are various isometric of a roof mirror 700 comprising first and second mirror elements 710, 720. FIG. 12D is an isometric view of first mirror element 710 of roof mirror 700 and FIG. 12E is an isometric view of second mirror element 720 of roof mirror 700. Roof mirror 700 has features that are generally analogous to the features of roof mirrors 200, 300 described above and similar features are assigned similar reference numerals except for the features of roof mirror 700 and preceded by the digit "7", whereas corresponding features of roof mirror 200 are preceded by the digit "2" and corresponding features of roof mirror 300 are preceded by the digit "3".

First and second mirror elements 710, 720 may be fabricated using materials and techniques similar to those of first and second mirror elements 210, 220. First mirror element 710 comprises a first planar mirrored surface 711 and a first abutment surface 712. Other than for the half-heart shaped perimeter of first mirrored surface 711, first mirrored surface 711 and first abutment surface 712 may be substantially similar to first mirror surface 211 and first abutment surface 212. Second mirror element 720 comprises a second mirrored surface 721 and a second abutment surface 722. Other than for the half-heart shaped perimeter of second mirrored surface 721, second mirrored surface 721 and second abutment surface 722 may be substantially similar to second mirror surface 221 and second abutment surface 222. In particular, in the illustrated embodiment, second abutment surface 722 comprises a pair of abutment sub-surfaces 722A, 722B, each of which as a cross-sectional width that is less than the width (w) of second mirror element 720 at the base 729 of second mirror element 720. Abutment sub-surfaces 722A, 722B may have features similar to abutment sub-surfaces 222A, 222B. Base 729 of second mirror element 720 may comprise a concavity 733 similar to concavity 233 located between abutment sub-surfaces 722A, 722B.

Like mirror 300 of FIG. 8, second mirror element 720 of the FIG. 12 embodiment comprises a body 735 with a "L-shaped" cross-section comprising a tail section 735A which provides second abutment surface 722 and a leg section 735B which provides second mirrored surface 721. In the illustrated embodiment, second abutment surface 722 of tail section 735A is oriented orthogonally to second mirrored surface 721 of leg section 735B. Tail section 735A extends away from mirrored surface 721 (in a direction away from the operative side of mirrored surface 721) by an amount which is greater than the extension of leg section 735B in the same direction. This extension of tail section 735A away from mirrored surface 721 provides a convenient location for projecting fasteners 730 through tail section 735A to attach first mirror element 710 to second mirror element 720, as described in more detail below.

First and second mirror elements 710, 720 of roof mirror 700 are oriented relative to one another such that first and second abutment surfaces 712, 722 contact one another in an abutting relationship. When so oriented, first and second mirror elements 710, 720 are attached to each other by fasteners 730 which pass through first and second abutment surfaces 712, 722. In the illustrated embodiment, fasteners 730 extend through slots 713, 723 defined in first mirror element 710 and in tail section 735A of second mirror element 720. As shown best in FIGS. 12D and 12E, slots 713, 723 have U-shaped cross-sections which open to the edges of first and second mirror elements 710, 720 (and, in particular, to the edges of first and second abutment surfaces 712, 722 and to the edge of tail section 735A of second mirror element 720). Slots 713, 723 permit fasteners 730 to slide through the openings in their U-shaped cross-sections and into slots 713, 723. Slots 713, 723 may be fabricated in a manner similar to holes 213, 223 described above. In some embodiments, slots 713 and/or slots 723 may be replaced by holes similar to holes 213, 223 described above.

Fasteners 730 may be substantially similar to fasteners 230 described above and may comprise first and second parts 731, 732. Fasteners 730 may be tightened to force first abutment surface 712 to bear against second abutment surface 722 in an abutting relationship. In the illustrated embodiment, first abutment surface 712 and first mirrored surface 711 are coplanar (or on parallel planes) and second abutment surface 722 and second mirrored surface 721 are oriented orthogonally to one another. This geometry causes the relative orientation of first mirrored surface 711 and second mirrored surface 721 to be orthogonal to one another when first abutment surface 712 abuts against second abutment surface 722 and mirror elements 710, 720 are attached to one another by fasteners 730. The orthogonal relationship between first and second mirrored surfaces 711, 721 provides roof mirror 700. Roof mirror 700 is frameless in the sense that it does not require any framing components (i.e. components other than mirror elements 710, 720 and fasteners 730) and is hollow in the sense that in use light (e.g. the light associated with reversing and inverting images of objects) is reflected from mirrored surfaces 711, 721 and does not penetrate mirror elements 710, 720.

Abutment surfaces 712, 722 may be ground and/or polished to achieve levels of flatness and corresponding accuracies of the angular separation between mirrored surfaces 711, 721 similar to those discussed above for roof mirror 200.

Like second mirror element 220 described above, second mirror element 720 comprises an optional support structure 725 along a side of second mirror element 720 generally opposing second mirrored surface 721. In the illustrated embodiment, support structure 725 comprises a raised portion 726 which extends away from the plane of second mirrored surface 721 in a direction away from the operative side of second mirrored surface 721 (e.g. extends relatively far in this direction as compared to the other portions of leg section 735B). Raised portion 726 may be fabricated in a manner similar to raised portion 226 described above. In the illustrated embodiment, raised portion 726 is shaped to provide a plurality of segments 726A which extend away from abutment surface 222 at locations selected such that slots 723 are located between segments 726A. In some embodiments, raised portion 726 may have other shapes. In some embodiments, raised portion 726 may be provided with orthogonal grids of segments similar to segments 226A, 226B described above. Raised portion 726 may be shaped to define concavities similar to concavities 227 described above. The amount of extension of raised portion 726 away from the plane of second mirrored surface 721 in the direction away from the operative side of second mirrored surface 721 may be constant, or it may vary. In the illustrated embodiment, the extension of raised portion 726 away from the plane of second mirrored surface 721 in the direction away from the operative side of second mirrored surface 721 decreases at locations further away from second abutment surface 722.

Raised portion 726 of support structure 725 may provide structural rigidity to second mirror element 720 so that second mirrored surface 721 remains substantially flat even when roof mirror 700 is subjected to vibrations, shocks, thermal expansion, or other forces. Support structure 725 can reduce the amount and corresponding cost of materials (and the corresponding weight of second mirror component 720) by providing a network of support (e.g. segments 726A of raised portion 726) at spaced apart locations which provide sufficient rigidity to maintain the flatness of mirrored surface 721 and the relative angle between second abutment surface 722 and second mirrored surface 721, while minimizing (or at least reducing) the amount of material (and the corresponding weight of material) used to make second mirror element 720. In some embodiments, the surface area of second mirror element 720 that is not covered by raised portion 726 is significantly larger than the surface area of raised portion 726 (e.g. 2.5 times larger, 5 times larger or 10 times larger in various embodiments) which achieves the aforementioned reduction on the amount, cost and weight of materials.

Raised portion 726 of support structure 725 may be shaped and/or located to permit access to the components of fasteners 730 while providing sufficient structural support for second mirror element 720—e.g. segments 726A may be located such that slots 723 are located between segments 726A to permit access to the components 731, 732 of fasteners 730, while providing sufficient support to second mirror element 720 in a vicinity of slots 723 which bear the strain associated with fasteners 730.

In the illustrated embodiment, first mirror element 710 also comprises an optional support structure 715 along a side of first mirror element 710 generally opposing first mirrored surface 711. In the illustrated embodiment, support structure 715 comprises a raised portion 716 which extends away from the plane of first mirrored surface 711 in a direction away from the operative side of first mirrored surface 711 (e.g. extends relatively far in this direction as compared to the other portions of first mirror element 710). Raised portion 716 may be fabricated in a manner similar to that of raised portion 216 described above. In the illustrated embodiment, raised portion 716 comprises a grid of orthogonally oriented segments 716A, 716B which extend at least part way across first mirror element 710. In the illustrated embodiment, raised portion segments 716A which are in a vicinity of slots 713 are divided to provide raised portions 716C having U-shaped cross-sections which extend on either side of U-shaped slots 713 (and, in the illustrated embodiment, define portions of U-shaped slots 713) to provide reinforced surfaces against which fasteners 730 can bear. In some embodiments, raised portion 716 may have other shapes. In some embodiments, raised portion 716 may be provided with orthogonal grids of segments similar to segments 216A, 216B described above. Raised portion 716 may be shaped to define concavities similar to concavities 217 described above. The amount of extension of raised portion 716 away from the plane of second mirrored surface 721 in the direction away from the operative side of second mirrored surface 721 may be generally constant (as is the case in the illustrated embodiment), or it may vary.

Raised portion 716 of support structure 715 may provide structural rigidity to first mirror element 710 so that first mirrored surface 711 remains substantially flat and the orientation of between first abutment surface 712 and first mirrored surface 711 is maintained, even when roof mirror 700 is subjected to vibrations, shocks, thermal expansion, or other forces. Also, support structure 715 can reduce the amount and corresponding cost and weight of materials associated with manufacturing first mirror element 710 and the corresponding weight of first mirror element 710. In these respects, support structure 715 may have characteristics similar to those of support structure 725 described above.

In other respects, features of roof mirror 700 (and its various components) may be the same as or similar to those of roof mirror 200 (and its various components) and/or roof mirror 300 (and its various components) described herein.

Figure 13A:
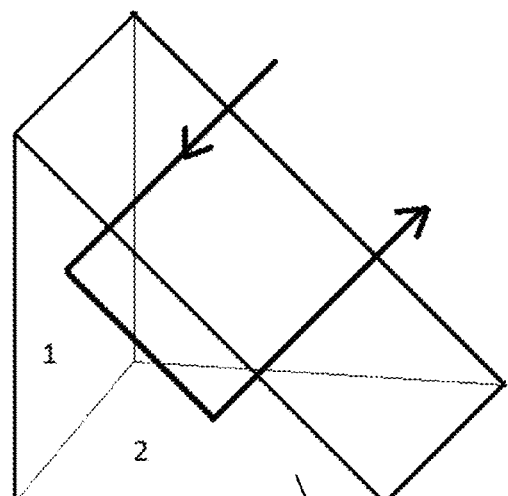
FIGS. 13A and 13B schematically depict how a roof mirror according to any of the embodiments described herein can be oriented for use to replace the inverting functionality of a prism used in a total internal reflection mode (i.e. a so-called single Porro prism).
Figure 13B:
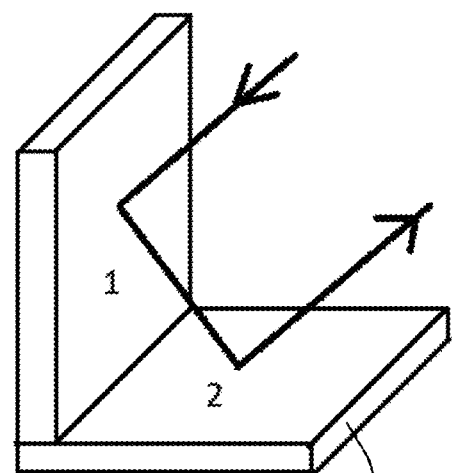

FIGS. 13A and 13B schematically depict how a roof mirror 810 according to any of the embodiments described herein can be oriented for use to replace the inverting functionality of a prism 800 used in a total internal reflection mode (i.e. a single Porro prism configuration). Such a single Porro prism configuration 800 is shown in FIG. 13A. Light entering facet 801 is transmitted to facet 802 where it is reflected and to facet 803 where it is reflected again before exiting facet 801 to invert any resultant image. FIG. 13B schematically depicts how roof mirror 810 according to any of the embodiments described herein can be used to provide this functionality of the single Porro prism configuration 800. Roof mirror 810 is oriented such that light reflects from mirrored surface 811 and again from mirrored surface 812 to provide similar functionality to the single Porro prism configuration 800 of FIG. 13A.

In some embodiments, such as where roof mirror 810 is used to replace a single Porro prism configuration 800 (FIG. 13A), the stringency on the desirability of the relative orientation of the roof mirror's mirrored surfaces is somewhat less. For example, in some embodiments, the mirrored surfaces can be oriented within 8 arc minutes of a desired angle (e.g. +/−8 arc minutes from orthogonal). In some embodiments, the desired relative orientation is within 5 arc minutes of a desired angle (e.g. +/−5 arc minutes from orthogonal). In such embodiments, the corresponding flatness of abutment surfaces may also be more relaxed—e.g. on the order of less than or equal to $0.5\lambda$, in some embodiments. Advantageously, flatnesses within this range may be achieved by grinding abutment surfaces and, in contrast to the prior art techniques involving optical bonding, without polishing. While fabricating roof mirror 810 may involve the polishing abutment surfaces, in some embodiments, polishing can be time consuming and correspondingly expensive. Further, in some situations, polishing the abutment surfaces can change the relative angle between the abutment surfaces and the mirrored surfaces causing a corresponding lack of manufacturing accuracy and/or precision as to the relative angle between the mirrored surfaces. Accordingly, in some embodiments, the fabrication of roof mirror involves grinding the abutment surfaces before they are attached together by fasteners and the abutment surfaces are ground (but not polished). Relative to the single Porro prism 800 (of FIG. 13A), roof mirror 810 of FIG. 13B is also relatively lightweight, as it can be fabricated with plane mirrors as opposed to a solid prism.

Figure 1:
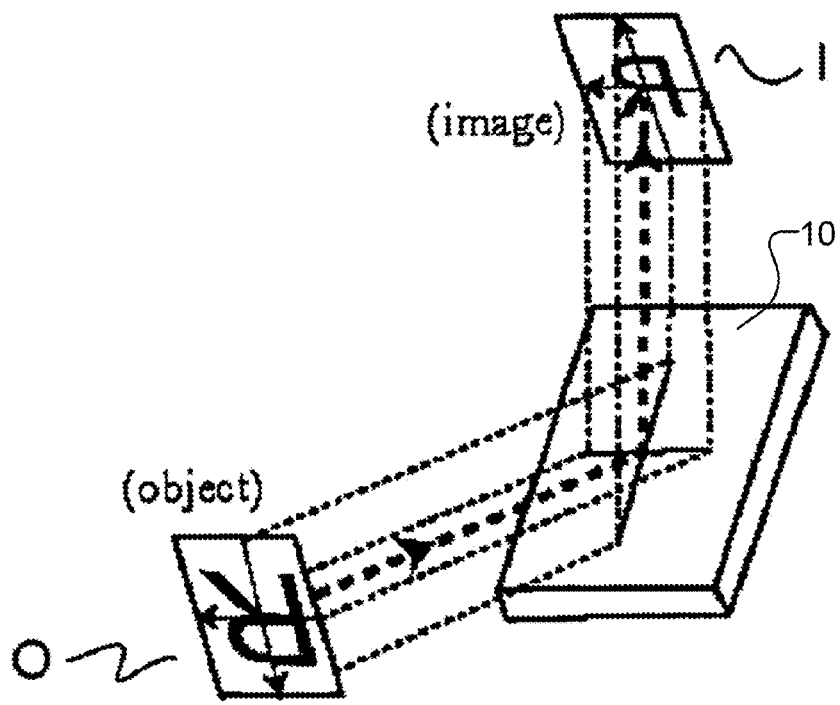
FIG. 1 is a front isometric view of a prior art plane mirror inverting an image of an object.
Figure 2:
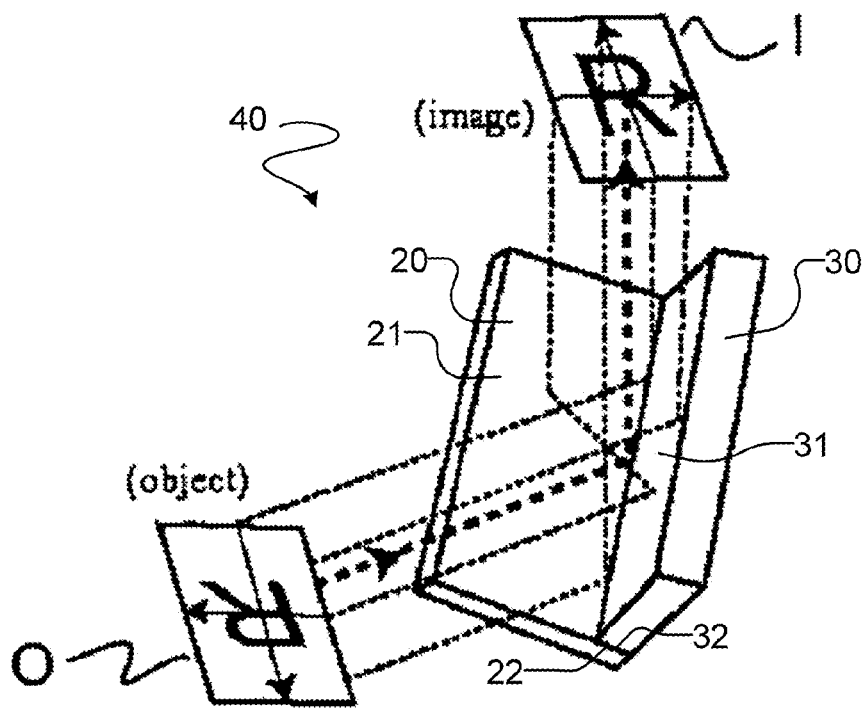
FIG. 2 is a front isometric view of a prior art hollow roof mirror inverting and reversing an image of an object.
Figure 3:
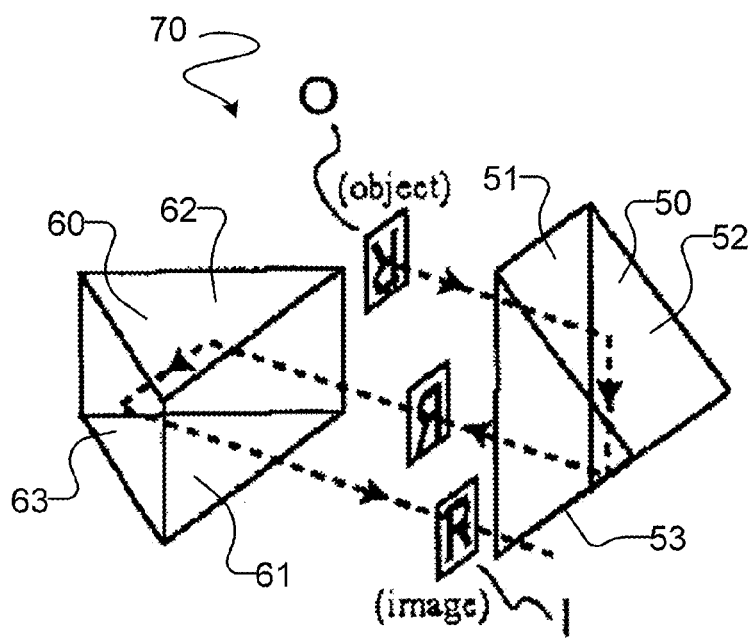
FIG. 3 is an exploded front isometric view of a prior art Porro prism inverting and reversing an image of an object.
Figure 4:
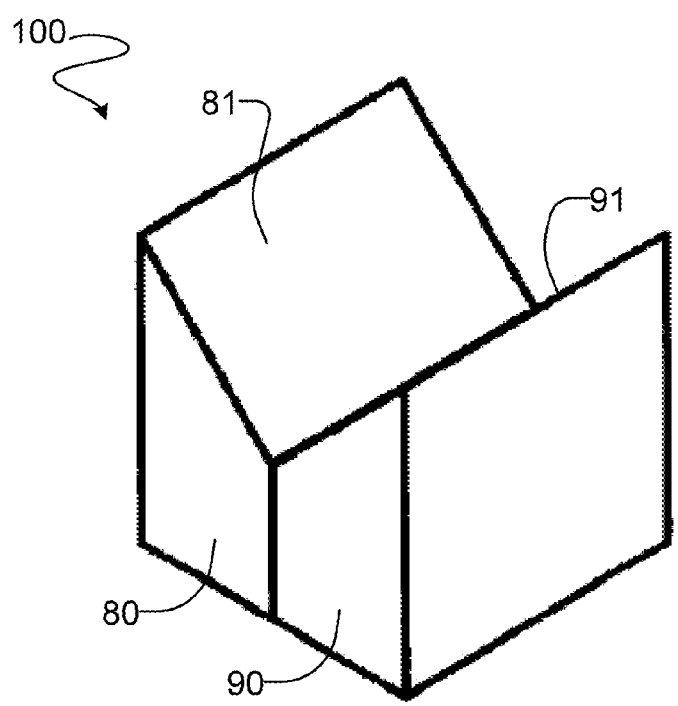
FIG. 4 is a front isometric view of a prior art hollow roof prism.
Figure 5:
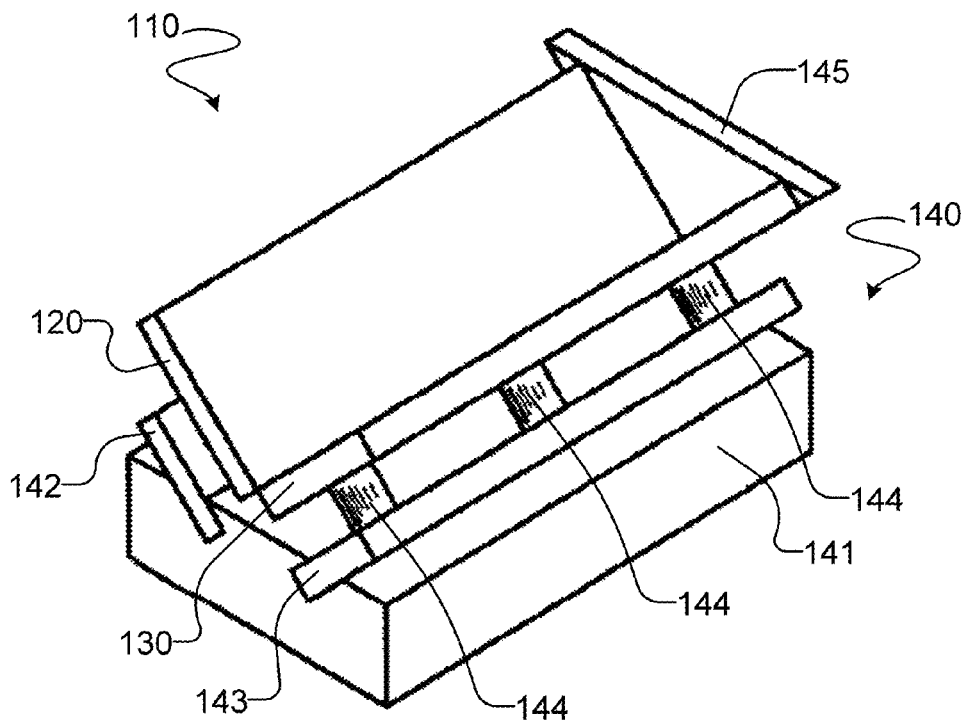
FIG. 5 is a front isometric view of a prior art framed hollow roof mirror.
Figure 6A:
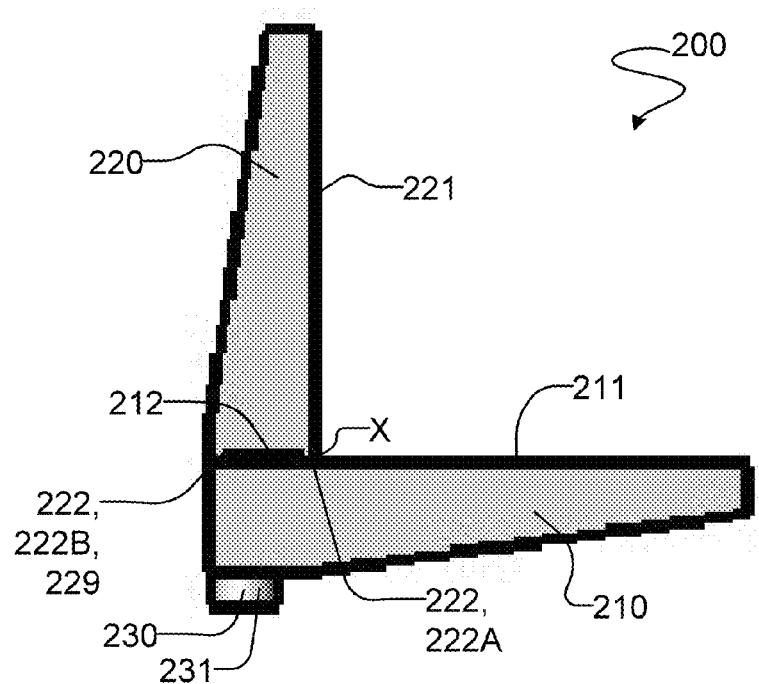
FIGS. 6A-6G (together, FIG. 6) are side elevation, front elevation, back elevation, front isometric, back isometric, top, and bottom views, respectively, of a roof mirror according to an example embodiment of the invention.
Figure 6B:
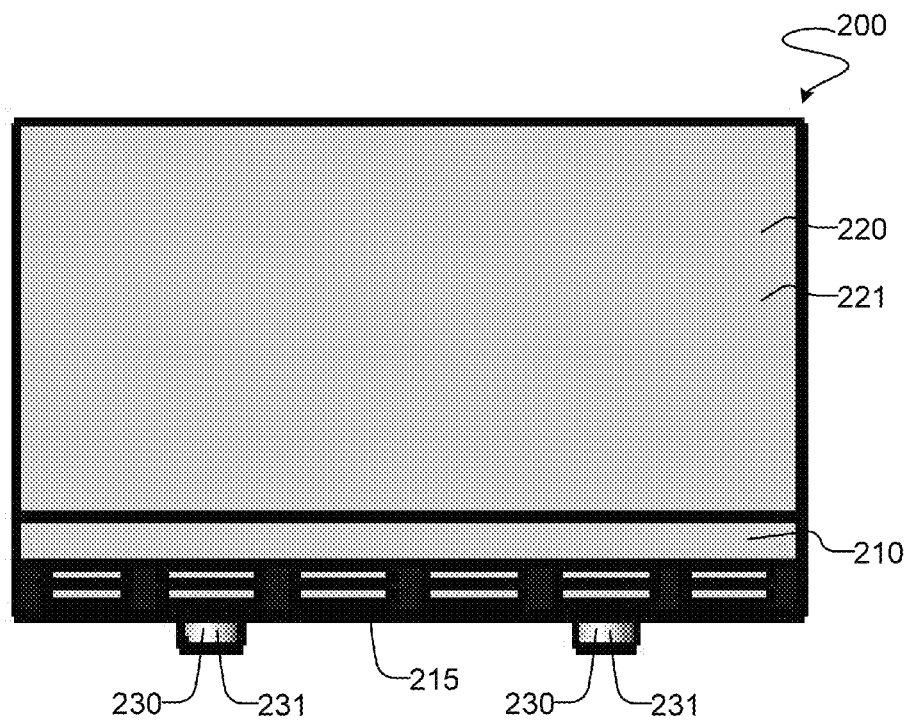
Figure 6C:
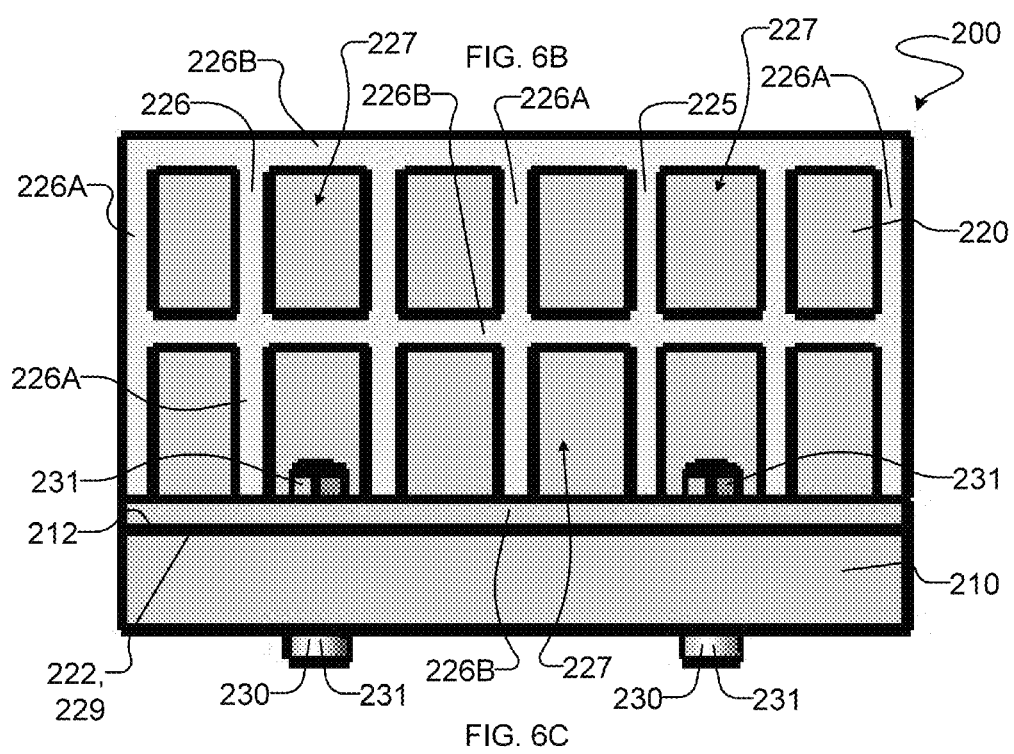
Figure 6D:
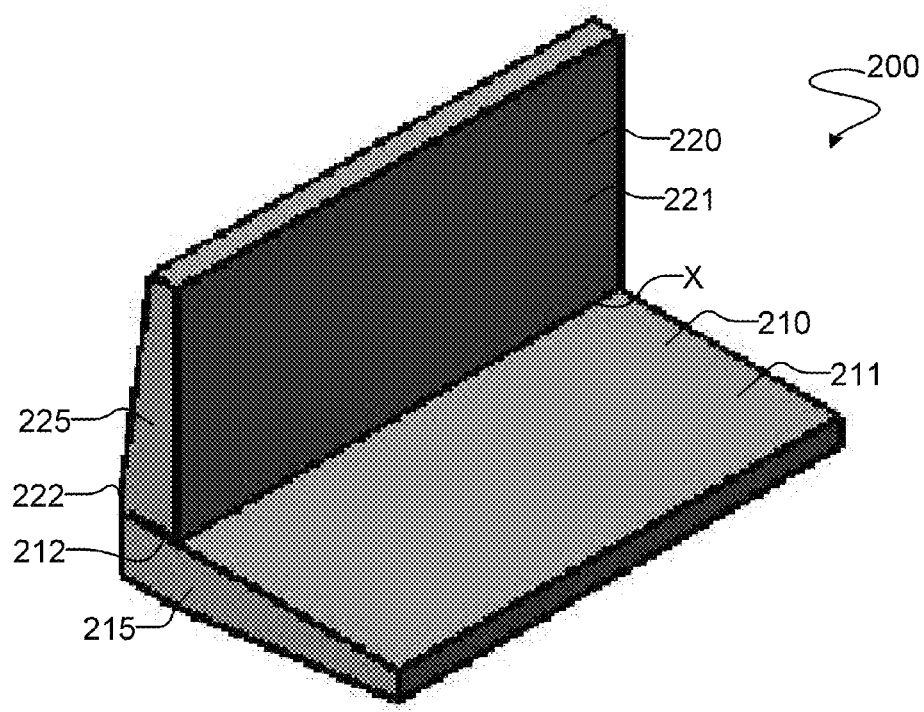
Figure 6E:
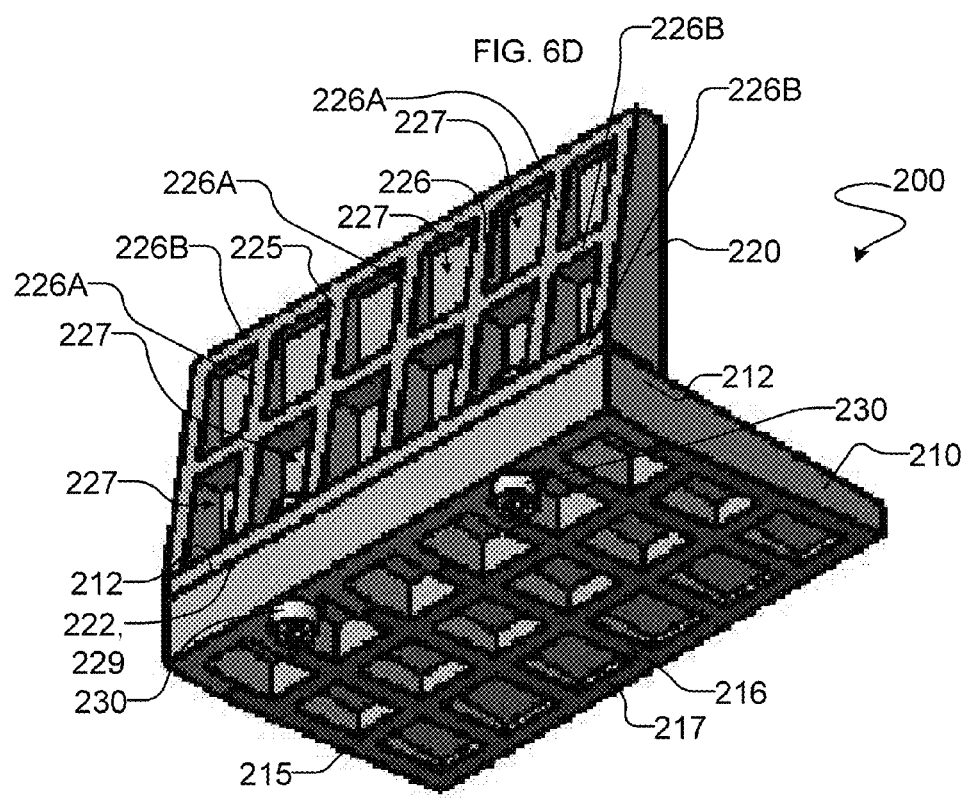
Figure 6F:
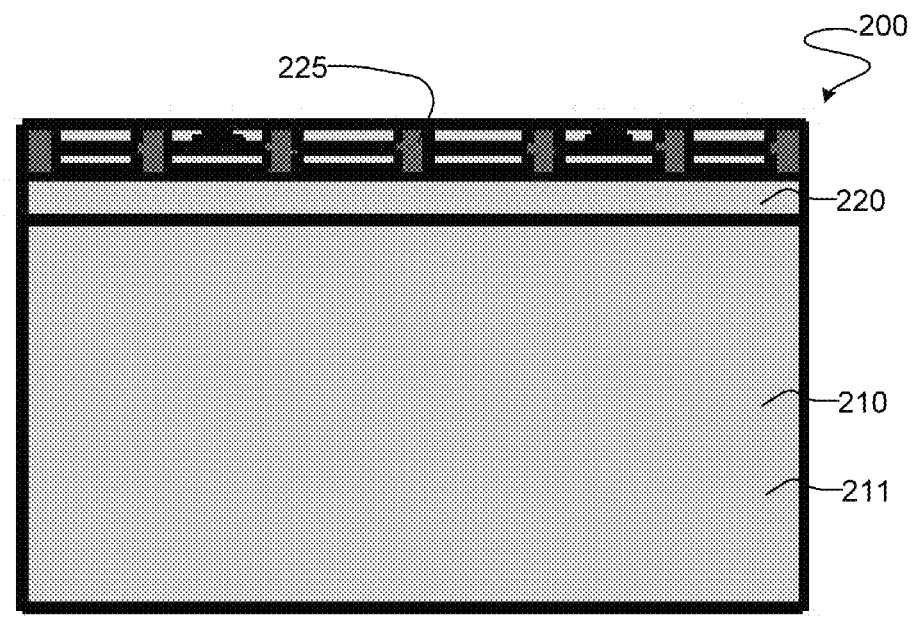
Figure 6G:
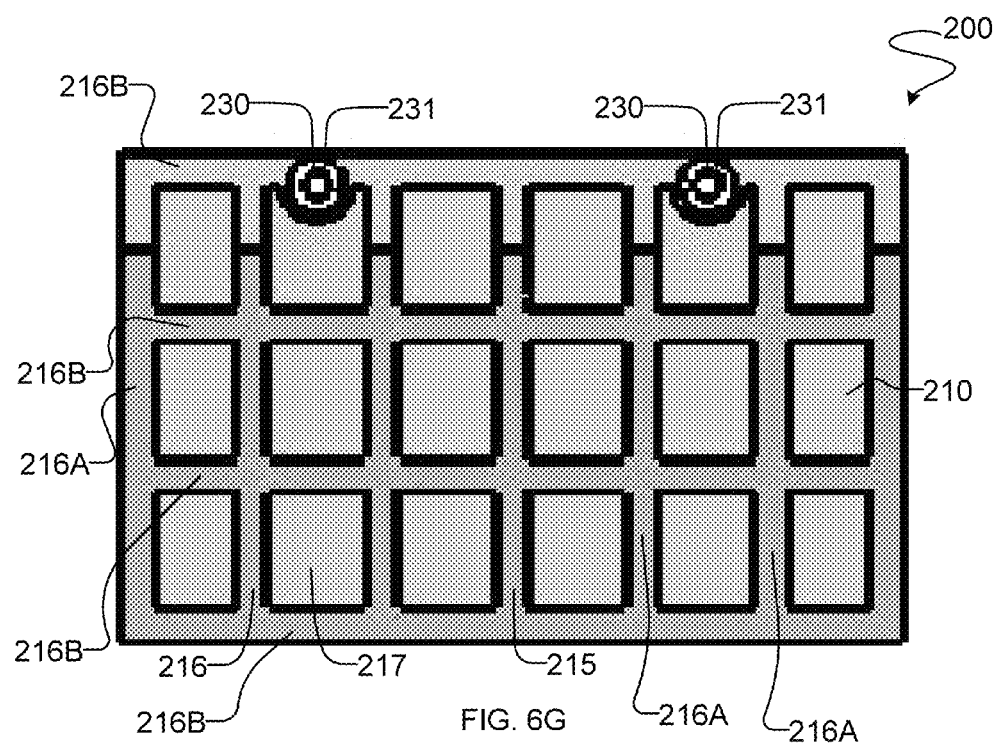
Figure 13C:
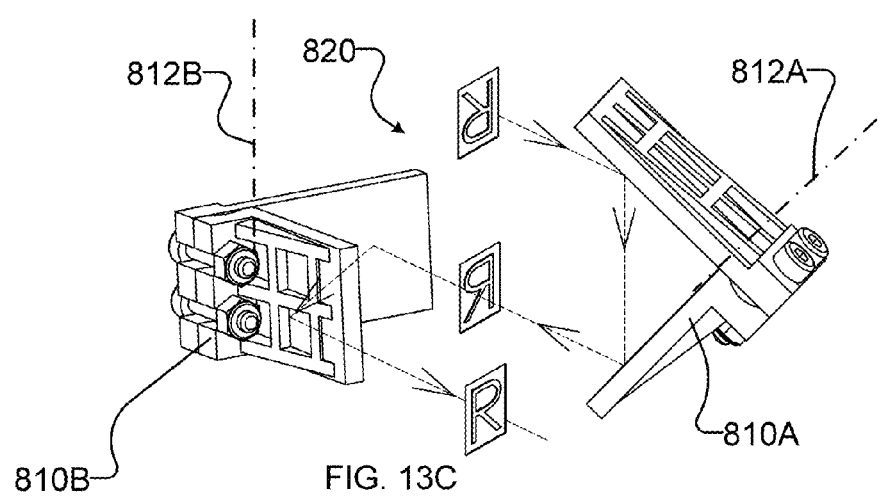
FIG. 13C schematically depicts how a pair of roof mirrors according to any of the embodiments described herein may be dimensioned and oriented to replace the inverting and reversing functionality of the double Porro prism configuration shown in FIG. 3.

FIG. 13C schematically depicts a roof mirror configuration 820 comprising a pair of roof mirrors 810A, 810B according to a particular embodiment which are oriented to replace the inverting and reversing functionality of the double Porro prism configuration 70 shown in FIG. 3. Roof mirrors 810A, 810B are oriented so that the operative sides of their mirrored surfaces are facing one another and so that there junctions 812A, 812B (i.e. the junctions between their respective mirrored surfaces) are generally orthogonal to one another. Each of the roof mirrors 810A, 810B may be the same as or similar to roof mirror 810 of FIG. 13B. While FIG. 13C shows a particular embodiment for roof mirrors 810A, 810B, the double Porro configuration 820 shown in FIG. 13C may generally be implemented by a pair of any of the roof mirrors described herein.

The advantages of roof mirror configuration 820 of FIG. 13C relative to the double Porro prism configuration 70 of FIG. 3 and relative to a similar double Porro configuration implemented using prior art (optically bonded) roof mirrors may be similar to those discussed above for the single Porro configuration roof mirror 810 of FIG. 13B. Advantageously, the double Porro configuration 820 of roof mirrors 810A, 810B may be used in binoculars and may provide suitable functionality with greater leniency with the regard to the relative angles between the individual mirrored surfaces (not expressly enumerated) of roof mirrors 810A, 810B and the corresponding flatness of the abutment surfaces (e.g. without stringent (or any) polishing requirements). Relative to the double Porro prism 70 (of FIG. 3), roof mirror configuration 820 of FIG. 13C is also relatively lightweight, as it can be fabricated with plane mirrors as opposed to solid prisms.

INTERPRETATION OF TERMS

Unless the context clearly requires otherwise, throughout the description and the claims/aspects:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification shall refer to this specification as a whole and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments. Non-limiting examples of alterations and modifications include:

- Roof mirrors according to the above-described embodiments (dimensioned appropriately) may be used to replace simple prisms (e.g. right angle prisms or prisms having any other desired angle) in applications where the light internally reflects off of the right angle (or other desired angle) surfaces of the prism, by orienting the corresponding mirrored surfaces in the directions of the prism surfaces from which light is internally reflected. This may have application in binoculars or in other applications where an image inverting function is desired, for example.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. An apparatus for providing a frameless hollow roof mirror, the apparatus comprising:
    a first element having a first mirrored surface and a first abutment surface;
    a second element having a second mirrored surface and a second abutment surface, the first and second elements arranged in a roof mirror configuration wherein the second abutment surface abuts against the first abutment surface and the first and second mirrored surfaces meet at a generally linear junction and are oriented relative to one another at a first roof mirror angle; and
    a plurality of fasteners extending through the first and second abutment surfaces and through the first and second elements;
    wherein the plurality of fasteners exert a force to cause the first and second abutment surfaces to bear against each other.

2. An apparatus according to claim 1 wherein the first roof mirror angle is 90 degrees and the first and second mirrored surfaces are oriented relative to one another an angle that is within 10 arc seconds of 90 degrees.

3. An apparatus according to claim 1 wherein the first abutment surface and the first mirrored surface are planar and the planes of the first abutment surface and the first mirrored surface are parallel to one another.

4. An apparatus according to claim 3 wherein the second abutment surface is non-parallel with the second mirrored surface.

5. An apparatus for providing a frameless hollow roof mirror, the apparatus comprising:
    a first element having a first mirrored surface and a first abutment surface;
    a second element having a second mirrored surface and a second abutment surface, the first and second elements arranged in a roof mirror configuration wherein the second abutment surface abuts against the first abutment surface and the first and second mirrored surfaces meet at a generally linear junction and are oriented relative to one another at a first roof mirror angle; and
    a plurality of fasteners extending through the first and second abutment surfaces;
    wherein the plurality of fasteners exert a force to cause the first and second abutment surfaces to bear against each other;
    wherein the first abutment surface and the first mirrored surface are planar and the planes of the first abutment surface and the first mirrored surface are parallel to one another;
    wherein the second abutment surface is non-parallel with the second mirrored surface;
    wherein the second abutment surface comprises a plurality of second abutment sub-surfaces which extend along longitudinal edges of the second abutment surface, the longitudinal edges parallel to the linear junction and wherein second abutment sub-surfaces are spaced apart from one another in a transverse direction orthogonal to the longitudinal edges.

6. An apparatus for providing a frameless hollow roof mirror, the apparatus comprising:
    a first element having a first mirrored surface and a first abutment surface;
    a second element having a second mirrored surface and a second abutment surface, the first and second elements arranged in a roof mirror configuration wherein the second abutment surface abuts against the first abutment surface and the first and second mirrored surfaces meet at a generally linear junction and are oriented relative to one another at a first roof mirror angle; and
    a plurality of fasteners extending through the first and second abutment surfaces;
    wherein the plurality of fasteners exert a force to cause the first and second abutment surfaces to bear against each other;
    wherein the first abutment surface and the first mirrored surface are planar and the planes of the first abutment surface and the first mirrored surface are parallel to one another;

wherein the second abutment surface is non-parallel with the second mirrored surface;

wherein the first element comprises an integrally formed first support structure comprising a first raised portion, the first raised portion extending away from the first mirrored surface in a direction away from an operative side thereof by a distance that is relatively far compared to locations of the first element away from the first raised portion.

7. An apparatus according to claim 6 wherein the first raised portion is shaped to define a plurality of concavities which open in the direction away from the operative side of the first mirrored surface.

8. An apparatus according to claim 6 wherein the first raised portion comprises one or more first segments which extend in a first direction and which are spaced apart from one another and one or more second segments which extend in a second direction and which are spaced apart from one another, the first and second segments intersecting one another to form a grid.

9. An apparatus according to claim 6 wherein the first raised portion comprises fastener-supporting segments which surround apertures through which the fasteners extend, the fasteners bearing on the fastener-supporting segments.

10. An apparatus according to claim 6 wherein the fasteners extend through slots in the first element, the slots having U-shaped cross-sections which open to an edge of the first element and wherein the first raised portion comprises fastener-supporting segments which define corresponding portions of the slots, the fasteners bearing on the fastener-supporting segments.

11. An apparatus according to claim 6 wherein distances that the first raised portion extends away from the operative side of the first mirrored surface decrease at locations further from first abutment surface.

12. An apparatus according to claim 6 wherein the second element comprises an integrally formed second support structure comprising a second raised portion, the second raised portion extending away from the second mirrored surface in a direction away from an operative side thereof by a distance that is relatively far compared to locations of the second element away from the second raised portion.

13. An apparatus according to claim 12 wherein the second raised portion is shaped to define a plurality of concavities which open in the direction away from the operative side of the second mirrored surface.

14. An apparatus according to claim 13 wherein portions of the plurality of fasteners are located in the concavities.

15. An apparatus according to claim 12 wherein the second raised portion comprises one or more first segments which extend in a first direction and which are spaced apart from one another and one or more second segments which extend in a second direction and which are spaced apart from one another, the first and second segments intersecting one another to form a grid.

16. An apparatus according to 15 wherein the fasteners project through the second element at locations between segments of the second raised portion.

17. An apparatus according to claim 12 wherein distances that the second raised portion extends away from the operative side of the second mirrored surface decrease at locations further from second abutment surface.

18. An apparatus for providing a frameless hollow roof mirror, the apparatus comprising:
a first element having a first mirrored surface and a first abutment surface;
a second element having a second mirrored surface and a second abutment surface, the first and second elements arranged in a roof mirror configuration wherein the second abutment surface abuts against the first abutment surface and the first and second mirrored surfaces meet at a generally linear junction and are oriented relative to one another at a first roof mirror angle; and
a plurality of fasteners extending through the first and second abutment surfaces;
wherein the plurality of fasteners exert a force to cause the first and second abutment surfaces to bear against each other;
wherein the first abutment surface and the first mirrored surface are planar and the planes of the first abutment surface and the first mirrored surface are parallel to one another;
wherein the second abutment surface is non-parallel with the second mirrored surface;
the apparatus further comprising a shim with a tapered profile located between the first and second abutment surfaces.

19. A method for assembling a frameless hollow roof mirror, the method comprising:
providing a first element having a first mirrored surface and a first abutment surface;
providing a second element having a second mirrored surface and a second abutment surface;
arranging the first and second elements in a roof mirror configuration wherein the second abutment surface abuts against the first abutment surface and the first and second mirrored surfaces meet at a generally linear junction and are oriented relative to one another at a first roof mirror angle; and
extending a plurality of fasteners through the first and second abutment surfaces and through the first and second elements to thereby exert a force to cause the first and second abutment surfaces to bear against each other.

20. A method according to claim 19 wherein the first roof mirror angle is 90 degrees and the first and second mirrored surfaces are oriented relative to one another an angle that is within 10 arc seconds of 90 degrees.

21. A method according to claim 19 wherein the first abutment surface and the first mirrored surface are planar and the planes of the first abutment surface and the first mirrored surface are parallel to one another.

22. A method according to claim 21 wherein the second abutment surface is non-parallel with the second mirrored surface.

23. A method for assembling a frameless hollow roof mirror, the method comprising:
providing a first element having a first mirrored surface and a first abutment surface;
providing a second element having a second mirrored surface and a second abutment surface;
arranging the first and second elements in a roof mirror configuration wherein the second abutment surface abuts against the first abutment surface and the first and second mirrored surfaces meet at a generally linear junction and are oriented relative to one another at a first roof mirror angle; and
extending a plurality of fasteners through the first and second abutment surfaces to thereby exert a force to cause the first and second abutment surfaces to bear against each other;

wherein the first abutment surface and the first mirrored surface are planar and the planes of the first abutment surface and the first mirrored surface are parallel to one another;

wherein the second abutment surface is non-parallel with the second mirrored surface; and the method further comprising providing the second abutment surface with a plurality of second abutment sub-surfaces which extend along longitudinal edges of the second abutment surface, the longitudinal edges parallel to the linear junction and spacing the second abutment sub-surfaces apart from one another in a transverse direction orthogonal to the longitudinal edges.

24. A method for assembling a frameless hollow roof mirror, the method comprising:

providing a first element having a first mirrored surface and a first abutment surface;

providing a second element having a second mirrored surface and a second abutment surface;

arranging the first and second elements in a roof mirror configuration wherein the second abutment surface abuts against the first abutment surface and the first and second mirrored surfaces meet at a generally linear junction and are oriented relative to one another at a first roof mirror angle; and extending a plurality of fasteners through the first and second abutment surfaces to thereby exert a force to cause the first and second abutment surfaces to bear against each other;

wherein the first abutment surface and the first mirrored surface are planar and the planes of the first abutment surface and the first mirrored surface are parallel to one another;

wherein the second abutment surface is non-parallel with the second mirrored surface; and the method further comprising providing the first element with an integrally formed first support structure comprising a first raised portion, the first raised portion extending away from the first mirrored surface in a direction away from an operative side thereof by a distance that is relatively far compared to locations of the first element away from the first raised portion.

25. A method according to claim 24 comprising shaping the first raised portion to define a plurality of concavities which open in the direction away from the operative side of the first mirrored surface.

26. A method according to claim 24 comprising providing the first raised portion with one or more first segments which extend in a first direction and which are spaced apart from one another and one or more second segments which extend in a second direction and which are spaced apart from one another, the first and second segments intersecting one another to form a grid.

27. A method according to claim 24 comprising shaping the first raised portion to provide fastener-supporting segments which surround apertures through which the fasteners extend and causing the fasteners to bear on the fastener-supporting segments.

28. A method according to claim 24 wherein the fasteners extend through slots in the first element, the slots having U-shaped cross-sections which open to an edge of the first element and wherein the method comprises shaping the first raised portion to provide fastener-supporting segments which define corresponding portions of the slots and causing the fasteners to bear on the fastener-supporting segments.

29. A method according to claim 24 wherein distances that the first raised portion extends away from the operative side of the first mirrored surface decrease at locations further from first abutment surface.

30. A method according to claim 24 comprising providing the second element with an integrally formed second support structure comprising a second raised portion, the second raised portion extending away from the second mirrored surface in a direction away from an operative side thereof by a distance that is relatively far compared to locations of the second element away from the second raised portion.

31. A method according to claim 30 comprising shaping the second raised portion to define a plurality of concavities which open in the direction away from the operative side of the second mirrored surface.

32. A method according to claim 31 wherein portions of the plurality of fasteners are located in the concavities.

33. A method according to claim 30 comprising shaping the second raised portion to provide one or more first segments which extend in a first direction and which are spaced apart from one another and one or more second segments which extend in a second direction and which are spaced apart from one another, the first and second segments intersecting one another to form a grid.

34. A method according to claim 33 comprising projecting the fasteners through the second element at locations between segments of the second raised portion.

35. A method according to claim 30 wherein distances that the second raised portion extends away from the operative side of the second mirrored surface decrease at locations further from second abutment surface.

36. A method for assembling a frameless hollow roof mirror, the method comprising:

providing a first element having a first mirrored surface and a first abutment surface;

providing a second element having a second mirrored surface and a second abutment surface;

arranging the first and second elements in a roof mirror configuration wherein the second abutment surface abuts against the first abutment surface and the first and second mirrored surfaces meet at a generally linear junction and are oriented relative to one another at a first roof mirror angle; and extending a plurality of fasteners through the first and second abutment surfaces to thereby exert a force to cause the first and second abutment surfaces to bear against each other;

wherein the first abutment surface and the first mirrored surface are planar and the planes of the first abutment surface and the first mirrored surface are parallel to one another;

wherein the second abutment surface is non-parallel with the second mirrored surface; and the method further comprising locating a shim with a tapered profile between the first and second abutment surfaces to adjust a relative orientation of the first and second mirrored surfaces.

37. A method according to claim 22 comprising tightening and/or loosening one or more of the plurality of fasteners to adjust an angle between the first mirrored surface and the second mirrored surface.

38. An apparatus for providing a Porro roof mirror configuration, the apparatus comprising a pair of hollow frameless roof mirrors according to claim 1, the pair of roof mirrors oriented relative to one another such that their generally linear junctions are orthogonal to one another and such that operative sides of their mirrored surfaces are facing one another.

* * * * *